(12) United States Patent
Kuroda et al.

(10) Patent No.: US 6,460,422 B1
(45) Date of Patent: Oct. 8, 2002

(54) DEVICE FOR CALCULATING A TORQUE OF A ROTATING MEMBER

(75) Inventors: Hidehiko Kuroda, Yokohama (JP); Shigeru Kanemoto, Yokohama (JP); Michio Sato, Yokosuka (JP); Takuhisa Kondo, Yokohama (JP); Makoto Ochiai, Yokohama (JP); Hitoshi Sakakida, Tokyo (JP); Tatsuo Yamashita, Koganei (JP); Kiyoto Oyagi, Yokohama (JP); Shuuichi Umezawa, Tokyo (JP); Kazuo Saito, Futtsu (JP); Hajime Obikawa, Tokyo (JP)

(73) Assignees: Kabushiki Kaisha Toshiba, Kawasaki (JP); The Tokyo Electric Power Co., Inc., Tokyo (JP)

( * ) Notice: Subject to any disclaimer, the term of this patent is extended or adjusted under 35 U.S.C. 154(b) by 0 days.

(21) Appl. No.: 09/699,480

(22) Filed: Oct. 31, 2000

(51) Int. Cl.[7] .................................................. G01L 1/24
(52) U.S. Cl. ................................................ 73/862.342
(58) Field of Search ................... 73/800, 762, 862.324

(56) References Cited

U.S. PATENT DOCUMENTS

| | | | | |
|---|---|---|---|---|
| 4,347,748 A | * | 9/1982 | Pierson | 73/862.34 |
| 4,962,669 A | * | 10/1990 | Gernhart et al. | 73/800 |
| 5,438,882 A | * | 8/1995 | Karim-Panahi et al. | 73/862.324 |
| 5,469,259 A | * | 11/1995 | Golby et al. | 356/351 |
| 5,694,216 A | * | 12/1997 | Riza | 365/349 |
| 6,057,911 A | * | 5/2000 | Reich | 356/35.5 |

FOREIGN PATENT DOCUMENTS

JP 6-034462 2/1994

* cited by examiner

*Primary Examiner*—Max Noori
(74) *Attorney, Agent, or Firm*—Oblon, Spivak, McClelland, Maier & Neustadt, P.C.

(57) ABSTRACT

A torque measuring device including a light irradiation element for irradiating a light, and a control unit operatively connected to the irradiation element so as to branch the light into a plurality of lights as beams and control a beam diameter of the respective lights so as to irradiate the lights on a surface of a member to be measured. The torque measuring device further includes a plurality of reflectors disposed on the surface of the member to be measured so as to change reflection state of the respective lights, a plurality of detectors for detecting the changes of intensities of the respective reflected lights and generating signals thereof, and a signal processor for processing the generated signals and operating a rotation period on the basis of the generated signals thereby to calculate a torque of the member to be measured.

18 Claims, 17 Drawing Sheets

MENVER TO BE MEASURED AS VIEWED
FROM ADIRECTLY UPPER SIDE

DEVICE FOR CALCULATING A TORQUE OF A ROTATING MEMBER

BACKGROUND OF THE INVENTION

The present invention relates to a torque measuring device for measuring a rotation rate and a torque of a a member of body to be measured such as rotating machine with a non-contact access at a remote portion.

A conventional art for measuring the torque of the rotating machine with a non-contact access is disclosed in Japanese Patent Laid-open Publication No. HEI 6-34462 as "a torque detecting device". This torque detecting device detects the torque generated in a shaft portion of a power transmission device of an automobile, for example.

FIG. 29 shows an arrangement of this torque detecting device. As shown in FIG. 29, a torque detecting device is provided with a linear optical reflector 2 for efficiently reflecting a light on an outer circumferential surface of a shaft 1 as a body of rotation to be measured. A first detecting portion 3 and a second detecting portion 4 are disposed so as to be opposed to the linear optical reflector 2 and are provided with light emitting elements 3a and 4a, and light receiving elements 3b and 4b, respectively. These detecting portions 3 and 4 has structures for generating lights towards different two positions in an axial direction of the shaft 1 by the light emitting elements 3a and 4a and to detect the reflected lights by the light receiving elements 3b and 4b.

Thus, rotation of the shaft 1 allows the light receiving elements 3b and 4b to detect signals obtained from the optical reflector 2 for every rotation period. The detected signals are formed by a waveform adjusting circuit to gain a pulse signal from the light receiving element 3b and a pulse signal of the light receiving element 4b, as shown in FIG. 30. A period T of the pulse signal represents the rotation time for the period. Further, by using a delay time t of the pulse signal of the receiving element 4b against the pulse signal of the receiving element 3b, the torque $F_t$ can be calculated according to the following mathematical equation (1) as below.

(Mathematical Equation 1)

$$F_t = 2\pi K x \cdot t / T \quad (1)$$

K: twisted spring constant of shaft 1
X: measured distance between two positions Thus, the above-mentioned torque detecting device irradiates the light from the light emitting elements 3a and 4a to the shaft 1 and receives the light reflected by the optical reflector 2 at the light receiving elements 3b and 4b. Then, based on the detected signals from the optical reflector 2 as shown in FIG. 31, the torque detecting device generates a pulse signal shown in FIG. 30 so as to calculate the rotation rate and the torque from a period of this pulse signal.

The conventional art for measuring the torque of the rotating machine is disclosed in Japanese Patent Laid-open Publication No. HEI 7-325095 as "a rotation rate measuring device".

FIG. 32 shows a diagram of this rotation rate measuring device. In FIG. 32, only major portions are given with reference numerals. In the rotation rate measuring device shown in FIG. 32, a light from a laser diode 5, which is generated in shape of pulse at a predetermined frequency, is made into a parallel light by a collimeter lens 6, and the light is then irradiated as the parallel light to a rotation member or body 7 to be measured. Since the reflecting light of the irradiated light is varied depending on irregularities 8 or the like, which are formed on the surface of the rotation body 7, the intensity of the reflected light changes according to the rotation of the rotation member 7.

In the rotation rate measuring device in FIG. 32, the thus reflected light is received by a photodiode 10 by using a lens 9 and the rotation rate is calculated through the signal processing of this received signal. In the signal processing, at first, the rotation ratemeasuring device extracts the signal of the reflected light of the laser beam, which is given with pulse modulation, by a bandpass filter (BPF) 11. The bandpass filter (BPF) 11 passes frequency component of 500 kHz therethrough. Then, a low pass filter (LPF) 12 removes a signal component with a high frequency. After removing the signal component with a high frequency, the change of time becomes the change of intensity for the reflected light, corresponding to the rotation period of the rotation body 7.

Next, a control circuit 13 digitizes the signal to give the fast Fourier transform action to the signal. Then, a frequency distribution can be measured as shown in FIG. 33. The rotation frequency of the rotation body 7 becomes a frequency $f_0$, which has a large distribution frequency. In this case, the rotation frequency T is $1/f_0$.

When calculating the torque, this rotation rate measuring devices should be set on two positions. In this case, a delay time t of a detection signal shown in FIG. 30 can be gained according to a mathematical equation (2), so that the torque can be calculated by using the following mathematical equation (1).

(Mathematical Equation 2)

$$t = |1/f_1 - 1/f_0| \quad (2)$$

$f_1$: rotation frequency, which is calculated by other rotation rate measuring device However, in the torque detecting device mentioned hereinbefore for measuring the torque of the rotation machine with the non-contact state, a rising time of a detection signal shown in FIG. 31 is usually defined by about several tens of $\mu$m. Accordingly, it is not possible to generate a pulse signal at an accuracy in time higher than this rising time and to obtain a frequency of the pulse signal. Therefore, in the case that the rotation rate is minutely varied for every rotation, there is a problem such that the rotation rate and the torque for every rotation is not obtainable with a high accuracy. For example, there is an expectation for a generator having an axis diameter of 850 mm and the rotation rate of 3000 rpm to obtain the torque by calculating the frequency of the pulse signal with a measuring accuracy of 100 ns for every rotation in order to monitor a generation efficiency with a high accuracy.

On the other hand, in the rotation rate measuring device mentioned hereinbefore for measuring the rotation rate of a machine with at the non-contact state, a signal corresponding to the rotation period of the rotation body 7 to be measured is extracted to be subjected to the Fourier transform, so that the rotation frequency $f_0$ is specified from the frequency distribution. In this device, in the case that the distribution of the rotation frequency $f_0$ is ideally large as shown in FIG. 33, it is possible to specify the rotation frequency $f_0$.

However, it is general that the rotation rate of the rotation body finely varies, and as shown in FIG. 34, the rotation rate of the rotation body owns a distribution having a center in the rotation frequency $f_0$. In the case of such frequency distribution, it is difficult to specify the rotation frequency $f_0$, thus providing a problem such that the rotation rate and the torque cannot be calculated with a high accuracy by using the mathematical equations (1) and (2). Further, the described device involves a problem such that it is not possible to calculate the torque by obtaining the rotation rate for every rotation in principle in order to specify the rotation frequency $f_0$ from the frequency distribution.

SUMMARY OF THE INVENTION

Accordingly, an object of the present invention is to substantially eliminate defects or drawbacks encountered in the prior art mentioned above and to provide a torque measuring device for obtaining a rotation frequency for every rotation with a measuring accuracy higher than 10ns with respect to a rotation member or body to be measured, of which the rotation rate varies minutely.

Another object of the present invention is to provide a torque measuring device capable of measuring axial change direction and axial moving amount and accurately measuring the torque even in a case where the axial change direction and the axial moving amount are different at driving side and loaded side other than the axial direction, or a case where a noise or performance lowering occurs in the device.

These and other objects can be achieved according to the present invention by providing a torque measuring device comprising:

an irradiation means for irradiating a light;

a control means operatively connected to the irradiation means adapted to branch the light into a plurality of lights as beams, control a beam diameter of the respective lights and irradiate the lights on a surface of a member to be measured;

a reflecting means including a plurality of reflectors disposed on the surface of said member to be measured so as to change reflection state of the respective lights;

a detecting means including a plurality of detectors for detecting changes of intensities of the respective reflected lights and generating signals thereof; and a signal processing means for processing the signals from the detecting means and operating a rotation period on the basis of the signals from the detecting means thereby to calculate a torque of said member to be measured.

In preferred embodiments, there is further provided an optical fiber through which the light from the irradiation means is transmitted to the control means.

The reflecting means comprises a low reflector having a reflection coefficient of the reflected light lower than that of the surface of the member to be measured. The reflecting means comprises a reflector including a high reflection area having a reflection coefficient of the reflected light higher than that of the surface of the member to be measured and a low reflection area having a reflection coefficient of the reflected light lower than that of the high reflection area. The reflecting means may include a reflector including a reflection area reflecting the irradiated light from the irradiation means in a direction to a location of the detecting means and a diffusing reflection area reflecting diffusingly at least one portion of the irradiated light from the irradiation means in a direction other than the direction of the detecting means.

The signal processing means is provided with a variable threshold setting means for varying a threshold according to a variation of an output of the detecting means to thereby extract a detection signal.

There is further provided a filtering means for removing a signal component other than the detection signal from the signals outputted from the detecting means, and also provided with a relative processing means for carrying out a relative processing of the output from the detecting means to obtain the torque of the member to be measured.

The detecting means comprise a first detector and a second detector and the first detector is mounted with a measuring means for monitoring the second detector to thereby measure a position change of the second detector. The first detector may be provided with an irradiation member for transmitting a light to the second detector and the second detector may be provided with a position change measuring means which detects the irradiated light and measures the position change of the first and second detectors.

The torque measuring device has a device body which is arranged along a circumferential or axial direction of the member to be measured.

The reflecting means includes the plural reflectors which are formed by directly forming reflection patterns on the member to be measured. Each of the reflectors is formed of a reflector member having high reflection amount having a length substantially the same as a circumferential length of the member to be measured and which is wound therearound, the reflector member being formed, at a portion thereof, with a low reflection area having less reflection light. The reflection pattern is a bar code pattern in which the low reflection area having less reflection light are formed in shape of plural lines to the reflector member having high reflection amount. The low reflection area has a shape variable along an axial direction of the member to be measured.

The control means comprises a plurality of beam controllers which are arranged in a plurality of pairs so that beam controllers of each pair oppose to each other at an angle of 18020 with the member to be measured being interposed therebetween.

As described above, according to the present invention, a light (beam) control means branches the irradiated light, which is capable of being measured in the inside of a machine or like to be measured or a narrow portion and is transmitted through an optical fiber or a space, into a plurality of the lights, and the beam control means controls a beam diameter of each light so as to be several $\mu$m. Then, the beam control means can irradiate the light on the member to be measured.

The reflecting means is composed of a plurality of reflectors which are disposed on the member to be measured to change the reflection state, so that a plurality of detecting means can obtain a plurality of pulse signals having a sharp rising time, a sharp lowering time and a specific shape of the waveform for every rotation.

A signal processing means performs the signal processing in consideration of the output variations with respect to the plural pulse signals having sharp rising and lowering times and the specific waveform, and the signal processing means also performs a mathematical operation of the rotation period and the torque with a desired high accuracy, which is higher than 10 ns.

Furthermore, according to the present invention, the reflector has a structure that the reflecting patterns are directly formed on the member to be measured and the reflector has high reflection amount having a length being the same as the length in the circumferential direction of the member to be measured, so that it is possible to provide a plurality of reflectors in parallel with the rotational axis of the member without being influenced by the size, the shape, the material and the state of the surface of the member or body to be measured. Thus, it is possible to measure the torque of the measured member with high accuracy even in the movement in the axial direction during the rotation of the measured member. Further, it is also possible to prevent a plurality of reflectors from being detached from the measured member by the use condition and an ambient condition of the member or body to be measured.

According to the preferred embodiments, in addition to the above effective functions, by using the optical fiber, the light beam can be transmitted to a portion inside a machinery or narrow space. By providing the reflector having low reflection coefficient to the member to be measured, the reflected light irradiated for a constant time for every rotation thereof can be made extremely small, and hence, the pulse signal having extremely short rising time can be obtained for every rotation. Further, the reflector having an area for reflecting and absorbing the light with a high efficiency minutely varies the intensity of the light irradiated for a constant time for every rotation.

The location of the variable threshold setting means makes it possible to extract the pulse signal considering the output variation of the detected signal.

The location of the filtering device can remove the noise component from the output signal from the detection means.

Furthermore, by performing the relative processing of the pulse signal for every rotation, the rotation period can be measured at a high accuracy, and the torque can be calculated by the delay time from the pulse signal generated from the detection means.

Through the monitoring of the second detector mounted to the first detector, the positional changes thereof due to vibration or impact can be measured, thus reducing the lowering of the torque measurement performance.

A plurality of measuring devices may be disposed along the circumferential direction of the member to be measured, and torques measured by these devices are averaged, thus improving the measurement performance.

The formation of reflection patterns on the member to be measured makes it possible to form the reflector in various shapes, dimensions or like and hence prevents the reflector from being peeled off or likely removed. The reflector may be formed as bar code, and in this case, the operation processing of the shaft torque can be performed at a high precision by the signal processor even in a case where noise or performance deterioration is caused to the torque measurement device.

Furthermore, since the low reflection area has a shape variable along the axial direction of the member to be measured, the positional change of the beam irradiation can be detected, so that the moving amount and the moving direction of the member in the axial direction can be obtained.

Still furthermore, the location of the plural beam controllers in the opposed arrangement can correct the measurement error and, hence, the torque can be precisely measured.

Further, it is to be noted that the nature and further characteristic features of the present invention will be made more clear from the following descriptions made with reference to the accompanying drawings.

DESCRIPTION OF THE PREFERRED EMBODIMENTS

Embodiments of the present invention will be described hereunder with reference to the accompanying drawings.

[Embodiment 1]

Figure 1:
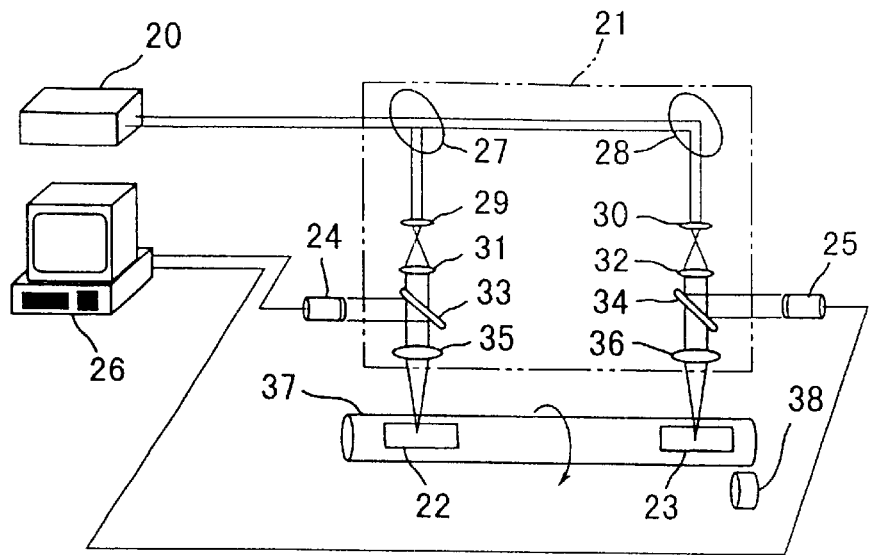
FIG. 1 is a diagram illustrating a first embodiment of a torque measuring device according to the present invention.
Figure 2:
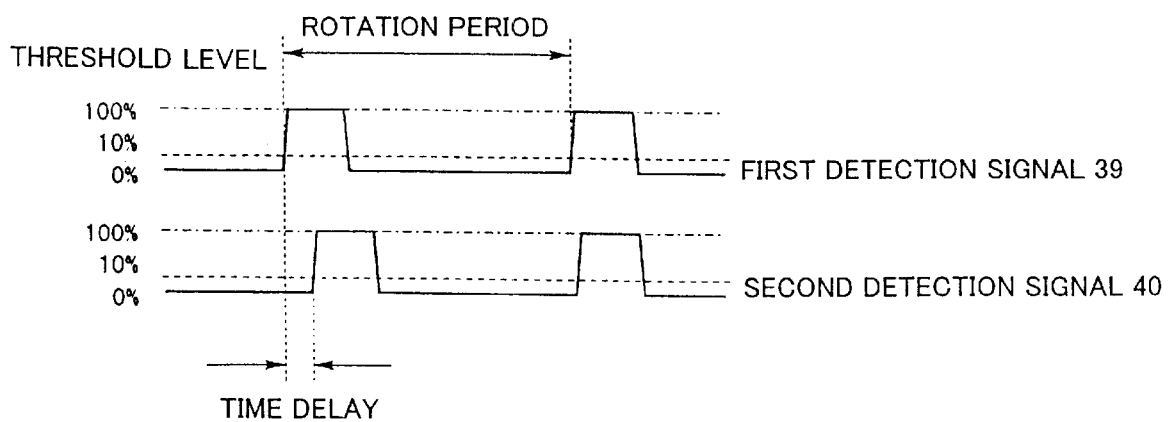
FIG. 2 is a timing chart showing a measured result, which is obtained from the first embodiment according to the present invention.
Figure 3:
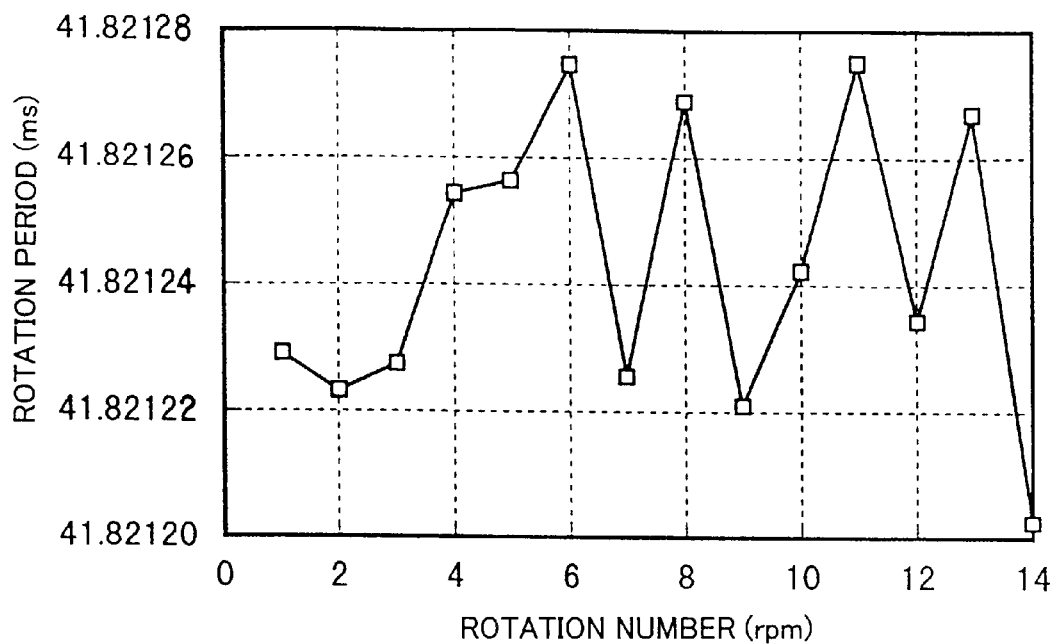
FIG. 3 is a graph showing a rotation rate, which is obtained by the first embodiment according to the present invention.

A first embodiment of the torque measuring device of the present invention will be first described hereunder with reference to FIGS. 1 to 3.

As shown in FIG. 1, the torque measuring device substantially comprises an irradiation device 20 for irradiating a light (beam), a beam controller 21 for branching the light into first and second lights as beams and controlling a beam diameter of each light to irradiate the first and the second lights to a rotation member or body 37 to be measured (which may be described hereunder as merely member or body 37, or measured member or body 37), a first reflector 22 and a second reflector 23, which are disposed on the surface of the member 37 to vary a reflection state of the first and the second lights, a first detector 24 and a second detector 25 for detecting the intensity variation of the reflected lights of the first and the second lights and a signal processing device (signal processor) 26 as a signal processing means for calculating the rotation period from signals outputted from the detectors 24 and 25 so as to calculate and obtain the torque of the member 37.

The irradiation device 20 comprises a light source for irradiating a directional light. Here, the light source is defined as a He—Ne laser in TEM$_{00}$ mode, which irradiates sequential light with a wavelength of 632.8 mm at an output of 10 mW. The light source is not limited to the He—Ne laser and various lasers may be available. Further, the light source in a pulse lightening type or in a continuous light type may be also available. The light source in the pulse lightning type or in the continuous light type comprises a combination of a lens, a slit, a pinhole and a reflector as a light emitting diode or a lamp so that the light source irradiates the light with a high intensity to a specified direction.

The light from the irradiation device 20 is divided into a reflected light and a transmitting light by a beam splitter 27 of a beam controller 21. On the side of the reflected light, lenses 29, 31, a beam splitter 33 and a condensing lens 35 are sequentially arranged on the same light path. The reflected light is irradiated to the member or body 37 to be measured via the lenses 29, 31, the beam splitter 33 and the condensing lens 35. On the other hand, on the side of the transmitted light, a mirror for reflection 28, lenses 30, 32, a beam splitter 34 and a condensing lens 36 are sequentially arranged on the same light path. The transmitted light, which is divided by the beam splitter 27, is reflected by the mirror 28 so as to be irradiated to the member 37 via the lenses 30, 32, the beam splitter 34 and the condensing lens 36.

In this state, the beam splitters 27, 33 and 34 may be composed of a wavelength plate. An optical system comprising of the lenses 29 and 31 is a forty times enlarged optical system and it can be substituted with a beam expander. In the same way, the lenses 30 and 32 may be substituted with the beam expander. The condensing lenses 35 and 36 may be composed of an achromatic lens, which corrects a spherical aberration or an aplanat such as an apochromatic lens or the like or an aspheric surface lens.

The first reflector 22 and the second reflector 23 are arranged so as to reflect the light, which is irradiated for every rotation of the body 37. The reflectors 22 and 23 are seal type mirrors, which reflect the light with a high efficiency. Further, any type mirror may be available as the reflectors 22 and 23, as far as reflecting the light with a high efficiency.

As the body 37 to be measured, there may be used, for example, a rotating machine with a rotation rate of 3000 rpm and a peripheral speed of about 125 m/s and having a diameter of 850 mm. The member 37 is given with a load on one side end by a load device 38.

For example, as a typical case, the rotating machine may be a coupling structure between a steam turbine and a generator in a combined cycle power generation plant. Further, in this embodiment, the body 37 to be measured will be applicable to the rotating machine formed of iron or stainless steel material and having a diameter of about 1 to 850 mm and a loaded value of several tens thousands Nm.

In the present embodiment, minute particles such as a particulate, a fluid or gas, moving objects such as an automobile, an air plane, a vessel and a train and machines, in which expansion is generated, may be applied as the rotation member or body 37 to be measured, so that the displacement amount, velocity and accelerated velocity thereof will be measured.

The reflected lights by the first reflector 22 and the second reflector 23 are detected by the first detector 24 and the second detector 25, which are composed of an avalanche photodiode. A photomultiplier tube and a photodiode are available for these detectors 24 and 25. The detection signals of the first and second detectors 24 and 25 are transmitted to the signal processing device 26 which is composed of general computers. This signal processing device 26 is provided with a variable threshold setting means for extracting a detection signal with varying a threshold in response to the output variation of the first and second detectors 24 and 25.

The operation of the torque measuring device according to the first embodiment of the structure mentioned above will be explained hereunder.

A laser beam with a beam diameter of 0.65 mm, which is irradiated from the irradiation device 20, is divided into a first laser beam which is reflected by the beam splitter 27 and a second laser beam which transmits through the beam splitter 27. With respect to the first laser beam, a beam diameter thereof is enlarged to 25 mm by an enlarging optical system of the lens 29 and the lens 31. This enlarged first laser beam is irradiated to the surface of the member 37 by the condensing lens 35 after transmitting through the beam splitter 33. In this state, it is necessary to minutely adjust a position of the condensing lens 35 so that the beam diameter of the first laser beam takes the focus on the surface of the measured body 37. The beam diameter W of the focus may be calculated by the following mathematical equations (3) and (4).

(Mathematical Equation 3)

$$W=2\lambda/\pi NA \quad (3)$$

λ: wavelength of laser beam to be irradiated
NA: numerical aperture of lens
(Mathematical Equation 4)

$$NA=\sin[\tan^{-1}(0.5\phi/f)] \quad (4)$$

φ: beam diameter of laser beam to be irradiated
f: focal distance of condensing lens 35

In the present embodiment, it is assumed that λ=632, 8 mm, φ=25 mn, f=50 mm and a beam diameter W=1.6 μm. Accordingly, the first laser beam on the surface of the member 37 becomes a Gauss distribution with a beam diameter of W=1.6 μm.

Further, the first laser beam which is irradiated on the member 37 is strongly reflected when irradiated to the first reflector 22 disposed on the member 37. However, except for the case, the quantity of the reflected light is extremely small. Therefore, the reflected light of the first laser beam is obtainable for a predetermined period for every rotation. This reflected light is mirror reflected by the reflector 22 to enter the condensing lens 35 via the same optical path as that of the irradiated beam. According to this condensing lens 35, the beam diameters φ' of the reflected light becomes 25 mm. Here, if the beam diameter φ of the irradiated beam and that φ' of the reflected light take the same values, it is possible to identify that the focus is taken on the surface of the member 37.

When the reflected light has a beam diameter of φ'=25 mm, the reflected light is separated by the beam splitter 33. One of the reflected lights enters the first detector 24, which is constituted of an avalanche photodiode. The first detector 24 only detects a strong reflected light, which is reflected by the reflector 22, for every rotation for a predetermined period. Therefore, the first detector 24 can obtain the first detection signal 39 with a pulse shape shown in FIG. 2. Since the beam diameter of the first laser beam on the surface of the member 37 is extremely small as 1.6 μm, the rising time of the first detection signal 39 becomes about ions.

On the other hand, the second laser beam, which is transmitted through the beam splitter 27, is reflected at right angle by the mirror 28. Then, the second laser beam is given by the same operation as that of the first laser beam. After the second laser beam has transmitted through the enlarge optical system of the lens 30 and the lens 32 and the beam splitter 34, a focus is taken on the surface of the measured body 37 by the condensing lens 36. Then, the second laser beam is irradiated so as to have a beam diameter of 1.6 μm.

After a beam diameter of the light reflected by the second reflector 23 becomes 25 mm by the condensing lens 36, the light reflected by the second reflector 23 is separated by the beam splitter 34 to enter the second detector 25. Since the detector 25 detects the strong reflected light of the reflector 23 for a predetermined period for every rotation, the detector 25 can obtain the second detection signal 40 with a pulse shape as shown in FIG. 2. Since the beam diameter of the second laser beam on the surface of the member 37 is extremely small as 1.6 μm as same as the first laser beam, the rising time of the second detection signal 40 becomes about 10 ns. Further, the signal processing device 26 takes therein the first detection signal 39 and the second detection signal 40 and calculates the rotation period and the torque.

Here, a threshold is set to an amplitude of the first detection signal 39 as shown in FIG. 2, so that the rotation period is obtained by the time interval of the adjacent thresholds. There is a case where amplitude voltages of the first detection signal 39 and the second detection signal 40 vary for every detection signal. Accordingly, the threshold should be determined at a rate corresponding to the amplitude voltage so as to be set to 10% thereof. This rate may be determined appropriately. The variation of the rotation period, which can be obtained from the present embodiment, is shown in FIG. 3. The rotation period may be also obtained from the second detection signal 40.

On the other hand, by setting the threshold of the second detection signal 40 as the same as that of the first detection signal 39 and comparing the first detection signal 39 with the second detection signal 40, the delay time is generated as shown in FIG. 2 owing to the load of the load device 38. As a result, the torque can be obtained for every rotation of the rotation member 37 by using the delay time and the mathematical equation (1).

As described above, according to this first embodiment, the first and the second laser beams transmit through a space to be irradiated to the body 37 to be measured. These laser beams have beam diameters of 1.6 μm on the surface of the body 37. Further, by detecting the reflected light of these beams by the detectors 24 and 25, since the reflectors 22 and 23 are disposed on the member 37, the first and the second detection signals 39 and 40 can be obtained, which has the rising time of about 10 ns for every rotation. The signal processing device 26 is capable of measuring the rotation period of the member 37 at a predetermined accuracy, which is shown in FIG. 3, owing to the setting of the threshold in conformity with a temporal amplitude variation of the detection signals 39 and 40. By using the delay time shown in FIG. 2 and the mathematical equation (1), it is possible to calculate and obtain the torque for every rotation at a predetermined high accuracy. The measuring accuracy in this case is 0.5% in torque measuring error (measuring angle: $6.85\times10^{-4}$ deg.), and the measuring error in a case of using a eddy-current sensor is 5 to 10%, so that the measuring accuracy or performance can be remarkably enhanced.

[Embodiment 2]

Figure 4:
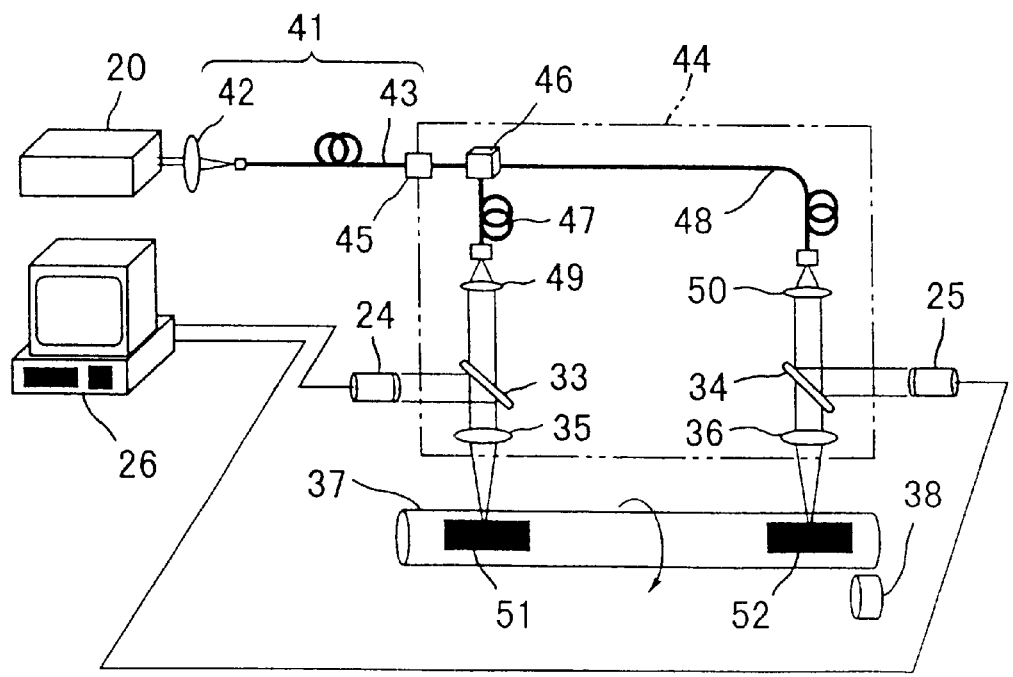
FIG. 4 is a diagram illustrating a second embodiment of a torque measuring device according to the present invention.
Figure 5:
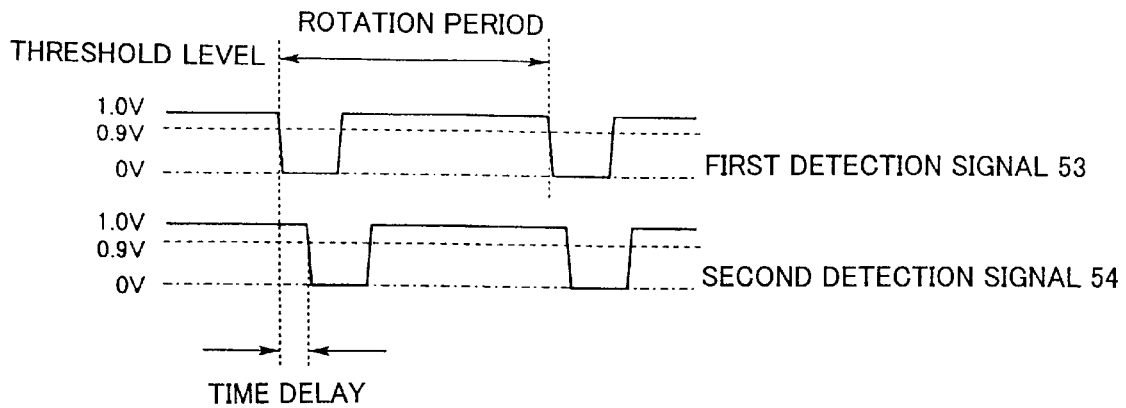
FIG. 5 is a timing chart showing a measured result, which is obtained from the second embodiment according to the present invention.
Figure 6:
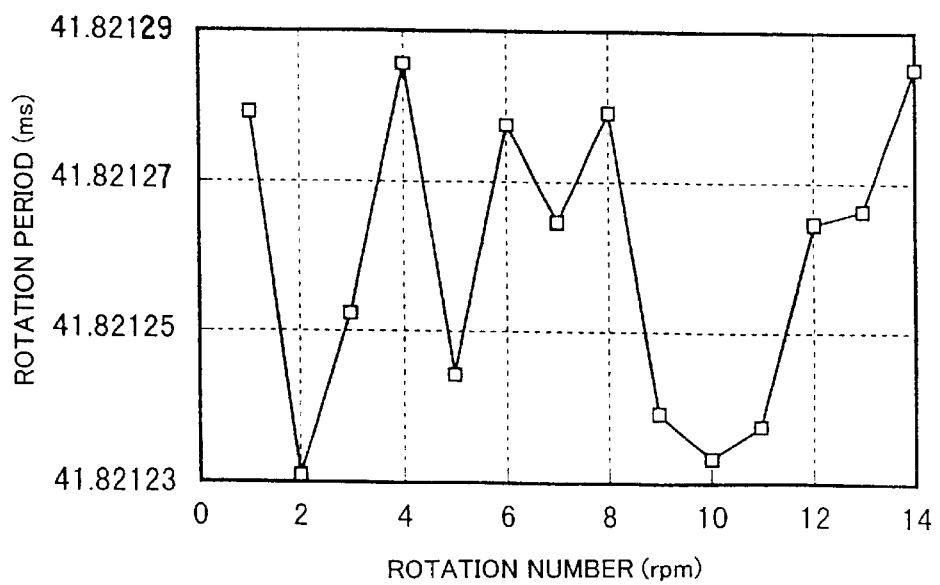
FIG. 6 is a graph showing a rotation rate, which is obtained by the second embodiment according to the present invention.

FIGS. 4 to 6 represent a second embodiment of a torque measuring device according to the present invention, in which the same reference numerals which are applied to those of the first embodiment are applied to the same elements or portions.

As shown in FIG. 4, the torque measuring device according to the second embodiment of the present invention substantially comprises an irradiation device 20 for irradiating a light, a light transmission device 41 for transmitting a light from the irradiation device 20, a beam controller 44 for branching the light into first and second lights as beams and controlling a beam diameter of each light to irradiate the first and second lights to a member or body 37 to be measured, a first low reflector 51 and a second low reflector 52, which are disposed on the surface of the member 37 to vary the reflection state of the first and the second lights, a first detector 24 and a second detector 25 for detecting the intensity variation of the reflected lights of the first and the second lights and a signal processing device 26 for calculating the rotation period from signals outputted from the detectors 24 and 25 to obtain the torque of the measured member 37.

The light transmission device 41 transmitting the light from the irradiation device 20 is comprised of an optical fiber 43 and a lens 42 which enters the light into the optical fiber. This optical fiber 43 may be, for example, SI type single mode and comprises a quarts fiber with a core diameter $\phi_f$ of 5 μm and a numerical aperture of 0.11. A core diameter of the optical fiber 43 is desirably as small as possible. The kinds of optical fibers are not limited to SI type, GI type, a single mode and a multiple mode, but any kinds of optical fibers may be available, for example, a multiple component system fiber, a plastic fiber and a polymer clad fiber and so on, as far as the He—Ne laser beam can be transmitted from the irradiation device 20. Furthermore, an optical connector 45 disposed on a beam controller 44 has a structure in which the optical fiber 43 is disposed detachable, and therefore, the optical connector 45 can be connected to an optical fiber with a necessary length as occasion demands.

The light transmitted to the beam controller 44 by the optical connector 45 is branched to optical fibers 47 and 48 by a branch connector 46. The optical connector 45 connects the optical fiber 43 and the beam controller 44 through butt coupling (coupling of flat surfaces) by using a metal ring (annular metal). Here, the optical connector 45 may take a structure of a butt coupling utilizing a V-shaped groove and a lens transmission structure, or the like in addition to the above-mentioned structure. Further, the optical fibers 47 and 48 comprise the same optical fiber as the optical fiber 43. The branch connector 46 is a prism and branched in two directions.

The light transmitted to the optical fiber 47 to be then emitted therefrom is irradiated to the member 37 via a lens 49, a beam splitter 33 and a condensing lens 35. On the other hand, the light transmitted to the optical fiber 48 to be then emitted therefrom is irradiated to the member 37 to be measured via a lens 50, a beam splitter 34 and a condensing lens 36. The lenses 49 and 50 may be composed of an achromatic lens, which corrects the spherical aberration or an aspheric or an aplanat lens such as an apochromatic lens.

A first low reflector 51 and a second low reflector 52 are arranged so as not to reflect the light, which is irradiated for a predetermined time for every rotation of the rotation member 37 to be measured. These low reflectors 51 and 52 are made of a black vinyl resin having a very small reflection coefficient compared with that of the surface of the member 37. The first and second low reflectors 51 and 52 may be made of any kind of materials capable of absorbing the light.

The operation of the torque measuring device according to the second embodiment having the structure mentioned above will be explained hereunder.

A laser beam irradiated from the irradiation device 20, for example, a laser beam with a beam diameter of 0.65 mm, is then guided to the optical fiber 43 by the lens 42. The light transmitted through the optical fiber 43 is guided to the beam controller 44 by the optical connector 45. Further, the light is equally branched into the optical fibers 47 and 48 by the branch connector 46. The first laser beam transmitted to the optical fiber 47 to be then emitted therefrom is made into a parallel light by the lens 49. The parallel light of the first laser beam is then transmitted through the beam splitter 33 to be irradiated on the surface of the member 37 by the condensing lens 35.

In this state, it is necessary to finely adjust a position of the condensing lens 35 so that the beam diameter of the first laser beam takes the focus on the surface of the member 37. The beam diameter $W_f$ on the surface thereof may be approximately calculated by the following mathematical equation (5).

(Mathematical Equation 5)

$$W_f \approx NA_{IN}/NA_{OUT} \cdot \phi_f \qquad (5)$$

$NA_{IN}$: numerical aperture of lens 49

$NA_{OUT}$: numerical aperture of condensing lens 35

In this second embodiment, the $NA_{IN}=0.11$ in order to make the numerical aperture of the lens 49 as same as that of an optical fiber. Since the $NA_{OUT}$ is 0.25 and $\phi_f$ is 5 μm, the beam diameter $W_f$ is 2.2 μm. Accordingly, the first laser beam on the surface of the measured body 37 has a beam diameter $W_f$ of 2.2 μm.

The first laser beam irradiated on the member 37 is not reflected when it is radiated to the first low reflector 51 disposed on the member 37, but is reflected thereon except for this case. Therefore, the reflected light of the first laser beam is not obtained for a predetermined period for every rotation. This reflected light comprises a speckle pattern on the surface of the member 37. If there is a reflected light, it enters the condensing lens 35 through the same light path as that of the irradiated light. According to the location of this condensing lens 35, the beam diameter $\phi_f'$ of the reflected light becomes 25 mm. Here, if the beam diameters of the radiated beam and that $\phi_f'$, of the reflected light take the same values, it is possible to identify that the focus is taken on the surface of the body 37 to be measured.

The reflected light of which beam diameter $\phi_f'$ becomes 25 mm is separated by the beam splitter 33, and one of the reflected lights enters the first detector 24, which is constituted of an avalanche photodiode. Since this first detector 24 detects a state of no reflected light of the first laser beam only for a predetermined period for every rotation, the first detector 24 can obtain the first detection signal 53 with a pulse shape shown in FIG. 5. Since the beam diameter of the first laser beam on the surface of the member 37 is extremely small, such as 2.2 μm, the lowering time of the first detection signal 53 becomes about 10 ns.

On the other hand, the second laser beam, to be branched to enter the optical fiber 48 by the branch connector 46, is given by the same operation as that of the first laser beam. After the second laser beam is made into a parallel light by the lens 50 so as to transmit through the beam splitter 34, the second laser beam is irradiated so that a focus is taken on the surface of the member 37 by the condensing lens 36. The second laser beam has a beam diameter of 2.2 μm on the surface of the member 37.

If the second laser beam, which has been irradiated on the member 37 to be measured 37, is irradiated on the surface thereof, the reflected light is obtained, and on the other hand, if the second laser beam, which has been irradiated on the measured body 37, is irradiated on the low reflector 52, the reflected light cannot be obtained. Accordingly, it is possible to obtain a state of no reflected light of the second laser beam only for a predetermined period for every rotation. If the reflected light is obtained, it enters the condensing lens 36 through the same light path as that of the irradiated light, and if the beam diameter of the irradiated beam and the reflected light are of the same values, it is possible to confirm that the focus is taken on the surface of the body 37. The reflected lights are separated by the beam splitter 34 and one of the separated reflected lights enters the second detector 25 in form of an avalanche photodiode. Since this second detector 25 detects the state of no reflected light of the second laser beam for the predetermined period for every rotation, the second detector 25 can obtain the second detection signal 54 with a pulse shape, which is shown in FIG. 5. Since the beam diameter of the second laser beam on the surface of the member 37 is extremely small such as 2.2 µm, the lowering time of the first detection signal 53 becomes about 10 ns. Further, the signal processing device 26 takes the first detection signal 53 and the second detection signal 54 and calculates the rotation period and the torque.

Then, the threshold is set at an amplitude of the first detection signal 53 as shown in FIG. 5, so that the rotation period is obtained by the time interval of the adjacent thresholds. Since the amplitude voltages of the first detection signal 53 and the second detection signal 54 are both about 1V, the thresholds of the first detection signal 53 and the second detection signal 54 are fixed to the voltage value of 0.9V. These thresholds may be determined appropriately according to the amplitude voltage. The variation of the rotation period, which can be obtained from the present embodiment, is shown in FIG. 6 and it is almost the same as the measurement result obtained in the first embodiment as mentioned hereinbefore. The rotation period may be also obtained from the second detection signal 54.

On the other hand, by setting the threshold of the second detection signal 54 to the same value as that of the first detection signal 53 and comparing the first detection signal 53 with the second detection signal 54, the delay time is generated as shown in FIG. 5 owing to the load of the load device 38. As a result, the torque can be obtained for every rotation by using the delay time and the mathematical equation (1).

As described above, according to the second embodiment, the laser beam of the irradiation device 20 can be transmitted to the inside of a rotation machine, for example, or a narrow space through the optical fiber 43, and therefore, the first and the second laser beams have beam diameters of 2.2 µm on the surface of the member 37 to be measured. Through the detection of the reflected lights of these beams by the detectors 24 and 25, since the low reflectors 51 and 52 are disposed on the member 37, the first and the second detection signals 53 and 54 can be obtained with the lowering time of about 10 ns for every rotation. The signal processing device 26 is capable of measuring the rotation period of the member 37 to be measured 37, which are shown in FIG. 6, at a predetermined accuracy owing to the fixing and setting of the threshold in conformity with the amplitude voltage of the detection signals 53 and 54. Furthermore, by using the delay time sown in FIG. 5 and the mathematical equation (1), it is possible to obtain the torque for every rotation at a predetermined high accuracy.

[Embodiment 3]

FIGS. 7 to 13 represent a third embodiment of a torque measuring device according to the present invention.

Figure 7:
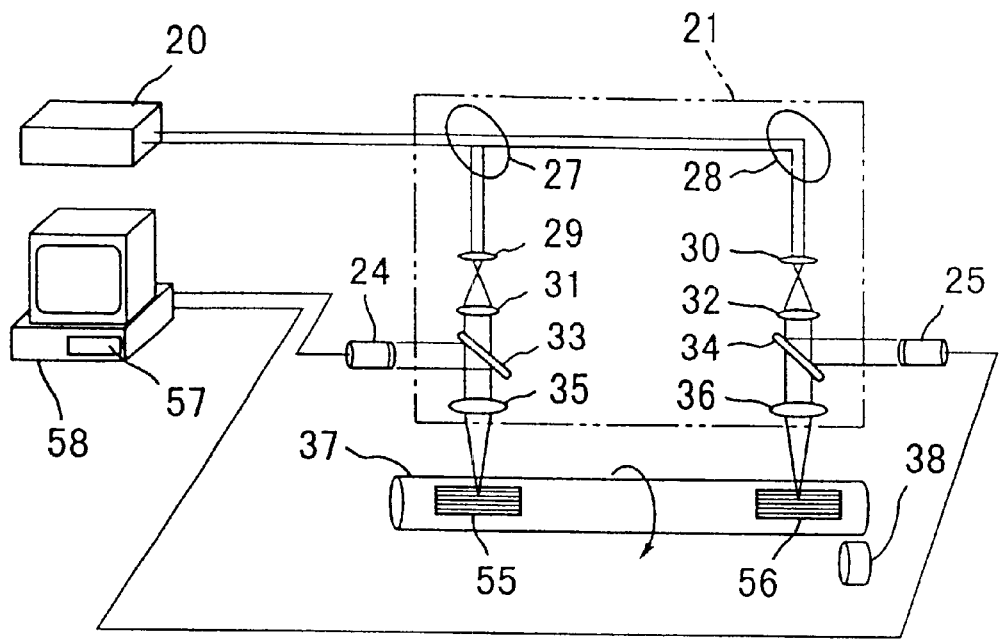
FIG. 7 is a diagram illustrating a third embodiment of a torque measuring device according to the present invention.

As shown in FIG. 7, the torque measuring device according to the third embodiment of the present invention substantially comprises an irradiation device 20 for irradiating a light (laser beam), a beam controller 21 for branching the laser beam into a first laser beam and a second laser beam and controlling a beam diameter of each laser beam to irradiate the first and the second laser beams to a member or body 37 to be measured, a first reflector 55 and a second reflector 56, which are disposed on the surface of the member 37 to vary the reflection state of the first and the second laser beams, a first detector 24 and a second detector 25 for detecting the reflected lights of the first and the second laser beams, a filtering device 57 for removing signal components except for the detection signals with respect to the output signals of these detectors 24 and 25 and a relative processing device 58 for relatively processing the output signals of the detectors 24 and 25 to obtain the torque of the member 37.

Figure 8:
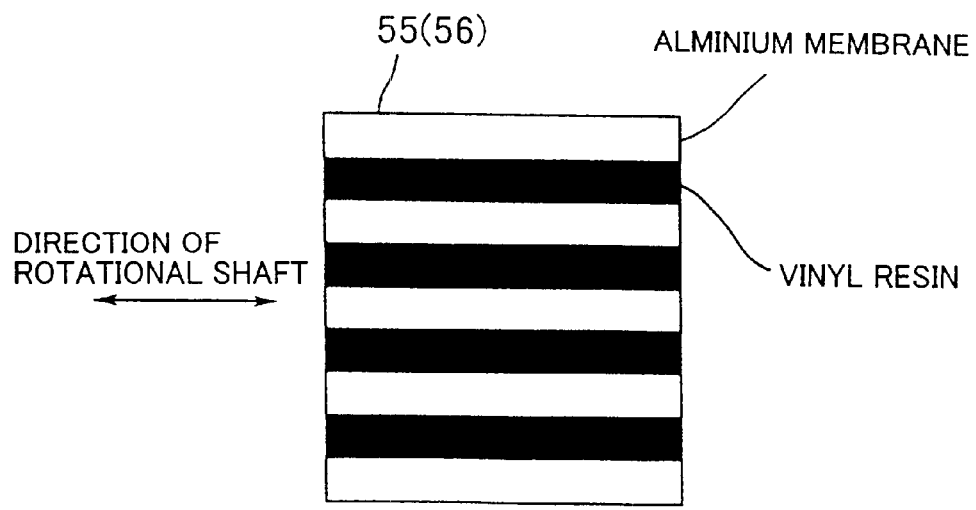
FIG. 8 is an enlarged view illustrating a reflector in FIG. 7.

A first reflector 55 and a second reflector 56 are arranged so as to have a size of 1 cm×1 cm as shown in FIG. 8. These reflectors 55 and 56 may be provided with a band-shaped reflecting portion for reflecting the irradiated light at a high efficiency and a band-shaped absorbing portion for alternately absorbing the light at a high efficiency. The width of these portions may be in order of several tens of µm. Here, the reflecting portion is made of an aluminum membrane in a mirror shape and the absorbing portion is made of a black vinyl resin. As for the material of the reflecting portion, any material may be available, if it could reflect the light at a high efficiency. As for the material of the absorbing portion, any material may be also available, if it could absorb the light. Further, through etching or half etching process of the aluminum membrane in the mirror shape, a low reflecting portion can be constituted without using a low reflecting substance. In the etching process, the surface of the measured body 37, which is stripped by the etching process, becomes the low reflecting portion, and in the half etching process, a half-etched portion diffusingly reflects the light, so that a mirror reflected light amount becomes small. Therefore, the half-etched portion becomes a low reflecting portion. The first and the second reflector 55 and 56 are arranged so that a band-shaped striping is in parallel with the rotation axis of the member 37. Owing to this arrangement, the intensity of the reflected light is extremely varied only for a predetermined time for every rotation.

The detection signals of the first detector 24 and the second detector 25 are transmitted to a filtering device 57 for performing the filtering processing and to the relative processing device 58 for performing the relative processing, respectively. The filtering device 57 and the relative processing device 58 are composed of general computers. The filtering device 57 digitizes the detection signals at a sampling frequency of 1 GHz and performs the filtering processing. The filtering device 57 may be composed of a filtering circuit, in which LCR is employed. The filtering device 57 may directly perform the filtering processing with respect to the detection signal. Further, the relative processing device 58 also may be composed of the relative processing device.

The operation of the torque measuring device according to this third embodiment having the structure mentioned above will be described hereunder.

A laser beam with a beam diameter of 0.65 mm, which is irradiated from the radiating device 20 is branched into a first laser beam reflected by a beam splitter 27 of the beam controller 21 and the second laser beam transmitting through the beam controller 21. The beam diameter of the first laser beam becomes 25 mm owing to the enlarge optical system of the lens 29 and the lens 31. The first laser beam, which is enlarged, transmits through a beam splitter 33 to take the focus on the surface of the member 37 by the condensing lens 35. Then, the first laser beam is irradiated so that the beam diameter thereof becomes 1.6 µm.

Here, in the case that the first laser beam, which is irradiated to the member 37, is irradiated to the first reflector 55, there is generated a particular reflection state so that the reflected light becomes strong and weak by turns, but except for this state, the reflected light on the surface is extremely weak. Thus, a particular reflection state occurs so that the reflected light becomes strong and weak by turns only for a predetermined time for every rotation. When the strong reflected light is given, the reflected light enters the condensing lens 35 through the same optical path as that of the irradiated light. Due to this condensing lens 35, the beam diameter φ' of the reflected light becomes 25 mm. If the beam diameter φ of the irradiated light beam and the beam diameter φ' of the reflected light are the same values, it is possible to confirm that the focus is taken on the surface of the member 37. The reflected light with the beam diameter φ' of 25 mm is separated by the splitter 33 and one of the reflected lights enters the first detector 24, which is composed of an avalanche photodiode.

Figure 9:
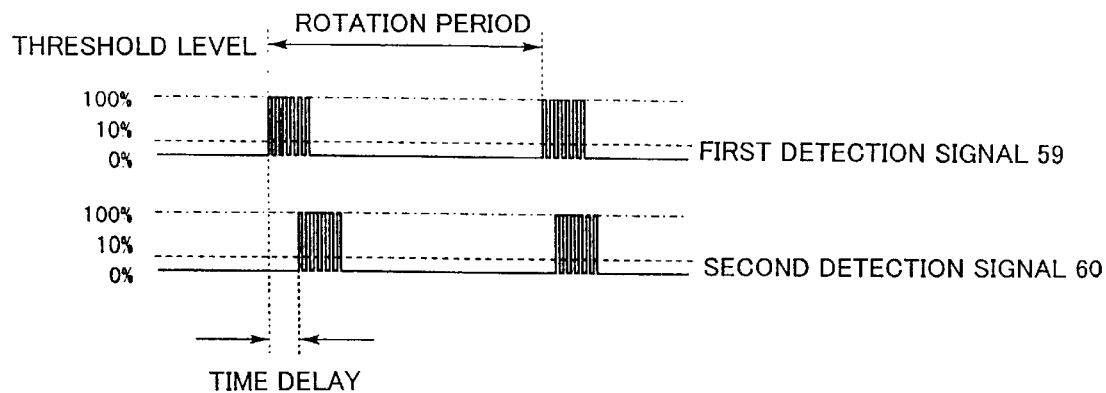
FIG. 9 is a timing chart showing a measured result, which is obtained from the third embodiment according to the present invention.

The first detector 24 detects the reflected light, but does not detect the signals when the reflected light becomes weak. Since the reflected light becomes strong and weak alternately, it is possible to obtain a first detection signal 59, which has a shape of teeth of a comb as shown in FIG. 9 for every rotation. Since the beam diameter of the first laser beam on the surface of the member 37 is extremely small as 1.6 μm, the rising time and the lowering time of the first detection signal 59 become about 10 ns.

On the other hand, the second laser beam is given by the same operation as that of the first laser beam after being reflected at the right angle by the mirror 28. Then, the second laser beam takes the focus on the surface of the member 37 by the enlarged optical system of the lens 30 and the lens 32 and the condensing lens 36 to be irradiated so that a beam diameter thereof becomes 1.6 μm. When the second laser beam is irradiated in the state that the reflected light of the second reflector 66 is weak, no reflected light is obtained. However, when the second laser beam is reflected in the state that the reflected light of the second reflector 66 is strong, it enters a condensing lens 36 through the same optical path as that of the irradiated light ray. After a beam diameter of the second laser beam is made into 25 mm by the condensing lens 36, the second laser beam is separated by a beam splitter 34 to enter the second detector 25.

Since the reflected light becomes strong and weak alternately in the second detector 25, it is possible to obtain a second detection signal 60. The second detection signal 60 has the same shape, i.e., a shape of teeth of a comb, as that of the first detection signal shown in FIG. 9 for every rotation. Since the beam diameter of the second laser beam on the surface of the member 37 is extremely small as 1.6 μm, the rising time and the lowering time of the second detection signal 60 become about 10 ns.

Further, the first detection signal 59 and the second detection signal 60 are taken into the filtering device 57 and the relative processing device 58 so as to calculate the rotation period and the torque of these detection signals. In other words, at first, the filtering device 57 allows the first and the second detection signals 59 and 60 to be separated into digital values at a sampling frequency of 1 GHz. Then, from the first and the second detection signals 59 and 60, which are separated into the digital values, noise frequency components are removed. The noise frequency components to be removed include frequency components with higher frequency than 50 kHz, since the frequency of the detection signal with respect to the reflector 55 to be signal processed has a frequency of several kHz.

Then, the first and the second detection signals 59 and 60, which are digitized and removed with the noise, are transmitted to the relative processing device 58. This relative processing device 58 obtains the rotation frequency from a cross-correlation function of two first detection signals 59, which are different in a time factor.

Figure 10:
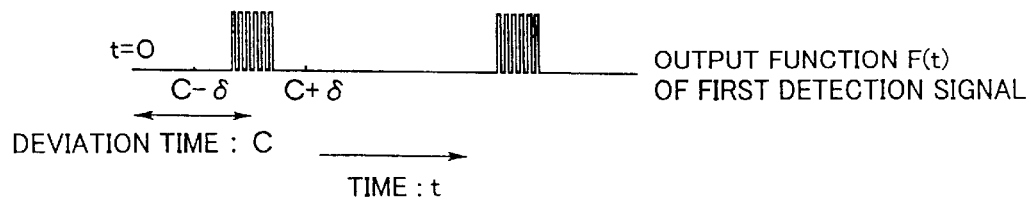
FIG. 10 is a view for illustrating a method of obtaining the rotation rate according to the third embodiment of the present invention.

In the present embodiment, as shown in FIG. 10, the output signals including the two pulse signals, which are different in a time factor, are extracted to be defined as a function of F(t). A cross-correlation function of Φ(τ) is defined by the following mathematical equation (6).

(Mathematical Equation 6)

$$\Phi(\tau) = 1/2\delta \cdot \sum_{t=C-\delta}^{t=C+\delta} (t+\tau) \cdot F(t) \tag{6}$$

C: deviation time of detection signal

τ: delay time

δ: time length of first detection signal

Here, by increasing a delay time τ from 0, a cross-correlation function of Φ(τ) is calculated. This calculation corresponds to the operation to search a degree of overlap with a next pulse signal by delaying a first pulse signal as shown in FIG. 10 in a time factor. If the delay time τ approaches the rotation frequency, this pulse signal corresponds to the next pulse signal and the value of the cross-correlation function of Φ(τ) increases. The value of the cross-correlation function of Φ(τ) takes the largest value when both of pulse signals correspond to at the most each other. The delay time τ at that time becomes the rotation period.

Figure 11:
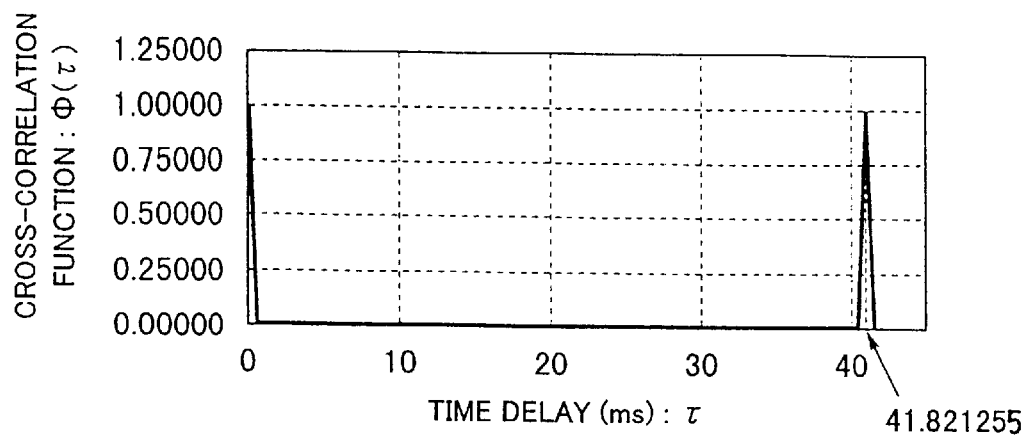
FIG. 11 is a graph showing the rotation rate, which is obtained from the third embodiment of the present invention.

Further, the result which is obtained from the calculation of the cross-correlation function of Φ(τ) according to the present invention is shown in FIG. 11. From the result of this calculation, the rotation period becomes 41.821255 ms. This rotation period may be obtained from the second detection signal 60 in the same way as that of the first detection signal 59.

Figure 12:
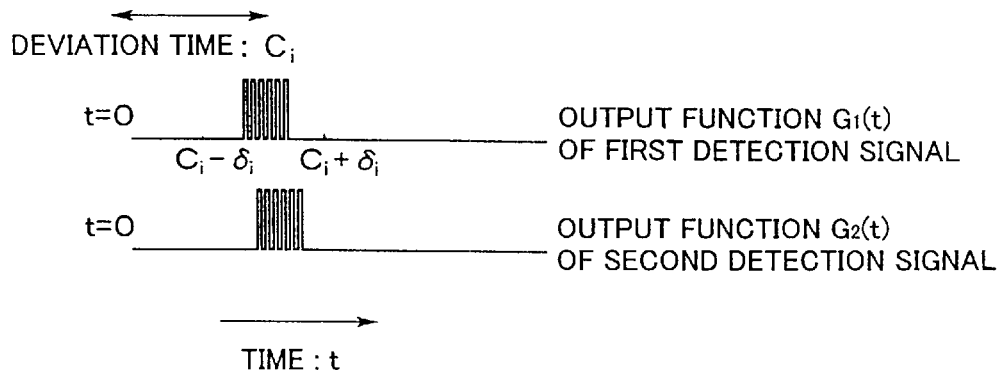
FIG. 12 is a view explaining a method of obtaining the torque according to the third embodiment of the present invention.

The torque is obtained from the cross-correlation function of the first detection signal 59 and the second detection signal 60. According to the present invention, as shown in FIG. 12, the output signal of the first detection signal 59 is extracted to be defined as a function: $G_1(t)$. The output signal of the second detection signal 60 is extracted to be defined as a function: $G_2(t)$. The cross correlation function of $\Phi_i(\tau)$ is defined by a mathematical equation (7).

(Mathematical equation 7)

$$\Phi(\tau) = 1/2\delta \cdot \sum_{t=C_i-\delta_i}^{t=C_i+\delta_i} G_1(t) \cdot G_2(t+\tau) \tag{7}$$

$C_i$: deviation time of first detection signal $\delta_i$: time length of first detection signal Here, the value of the cross correlation function $\Phi_i(\tau)$ is calculated by increasing the delay time τ from 0. This calculation corresponds to the operation to delay the pulse signal of the first detection signal 59 in a time factor and search the degree of the overlap with the pulse signal of the second detection signal 60. Since the pulse signals of the first detection signal 59 and the second detection signal 60 have the same shape, there is no delay time when the load of the load device 38 does not exist. Accordingly, the pulse signals of the first and the second detection signals 59 and 60 correspond to each other. On the other hand, when the load of the load device 38 exists, the delay time occurs in the pulse signal of the second detection signal 60. This delay time comprises the delay time τ. In the delay time τ, the pulse signal of the first detection signal 59 is shifted in a time factor to correspond to the pulse signal of the second detection signal 60, and the cross-correlation function $\Phi_i(\tau)$ becomes the largest.

Figure 13:
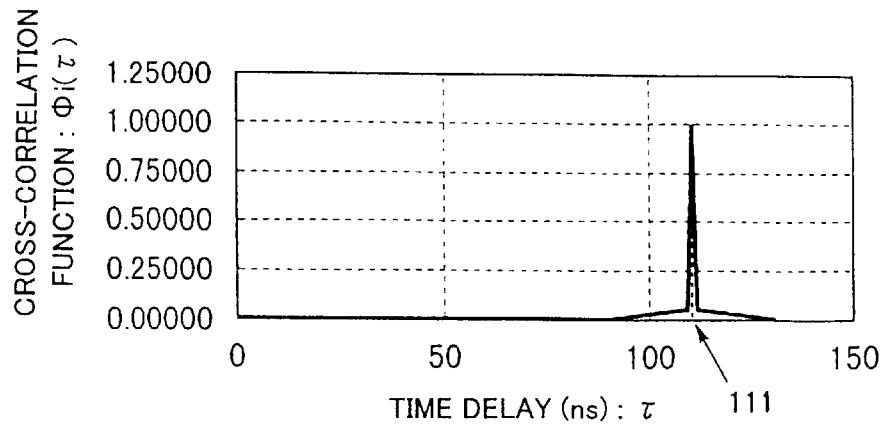
FIG. 13 is a graph showing the torque, which is obtained from the third embodiment of the present invention.

The calculation result of the cross-correlation function $\Phi_i(\tau)$ according to the present invention is shown in FIG. 13.

As a result, the delay time τ becomes 111 ns. The torque for every rotation of the member 37 can be obtained by using this delay time and the mathematical equation (1).

As described above, according to the present invention, the first laser beam and the second laser beam transmit through a space and are radiated to the member 37. Then, the first laser beam and the second laser beam have a beam diameter of 1.6 μm on the surface of the member 37, respectively. Detection of the reflected light by using the detector 24 and 25 allows the first and the second detection signals 59 and 60 to be obtained for every rotation by the reflector 55, by which the intensity of the reflected light extremely varies. The first and the second detection signals 59 and 60 have a rising time and a lowering time of about 10 ns, which are very short and in a shape of teeth of a comb as shown in FIG. 9. The first and the second detection signals .59 and 60 become signals with the rising time and the lowering time of about 10 ns even under a noise environment, since the noise component with higher frequency than 50 kHz is removed therefrom by using the filtering device 57.

The relative processing device 58 has very short rising time and lowering time, which are in about 10 ns. Therefore, by the relative processing of the first and the second detection signals 59 or 60, which are in an intricate shape of teeth of a comb, the relative processing device 58 can measure the rotation period of the measured body 37 for every rotation at a high accuracy, as shown in FIG. 11. Further, through the relative processing of the first and the second detection signals 59 and 60, the delay time shown in FIG. 13 can be obtained. Accordingly, by using this delay time and the mathematical equation (1), the torque for every rotation can be obtained at a predetermined high accuracy.

According to the first through the third embodiments described above, the beam controllers 21, 44 and the first and second detector 24, 25 are physically connected to be fixed.

[Embodiment 4]

Figure 14:
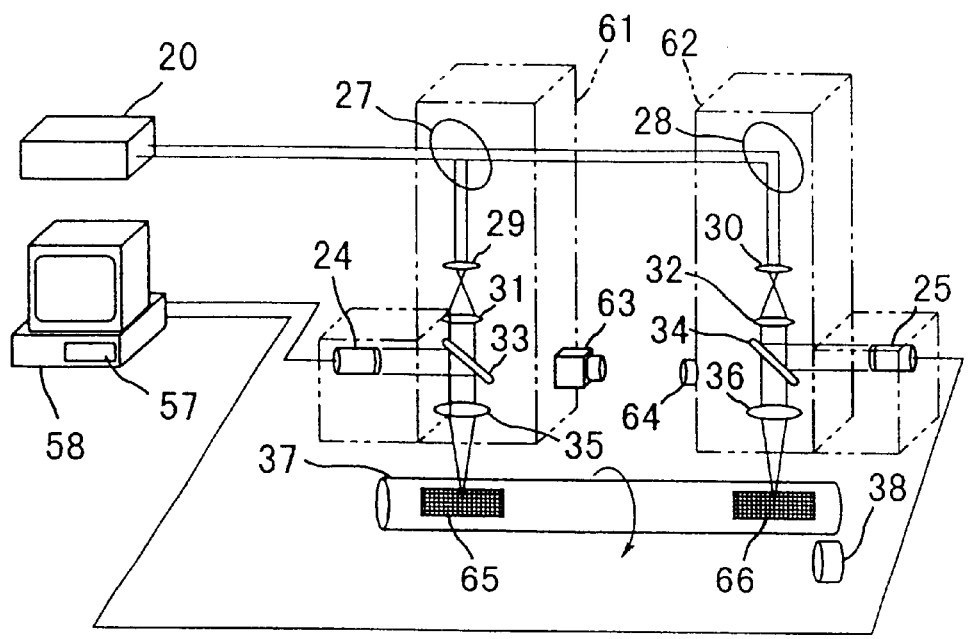
FIG. 14 is a diagram illustrating a fourth embodiment of a torque measuring device according to the present invention.
Figure 15:
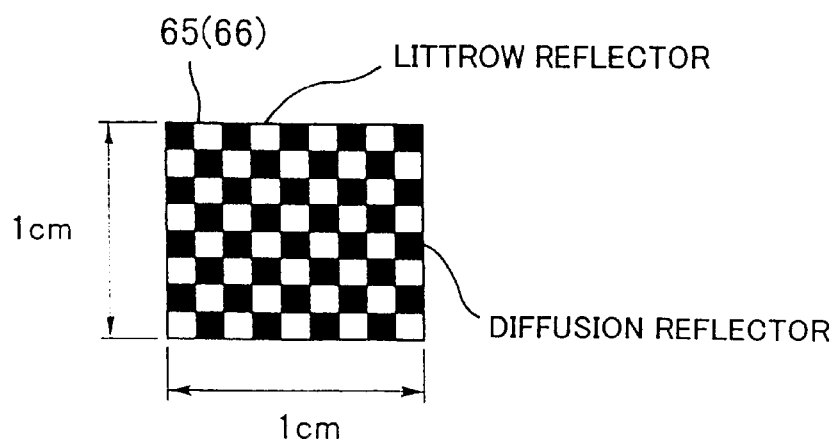
FIG. 15 is an enlarged view showing a reflector in FIG. 14.

FIGS. 14 and 15 represent a fourth embodiment of a torque measuring device according to the present invention.

As shown in FIG. 14, the torque measuring device according to the fourth embodiment of the present invention substantially comprises an irradiation device 20 for irradiating a laser beam, a first optical (light) transmitter-receiver 61 and a second optical (light) transmitter-receiver 62 for branching the laser beam into a first laser beam and a second laser beam and controlling a beam diameter of each laser beam to radiate the first and the second laser beam to a member or body 37 to be measured, a first reflector 65 and a second reflector 66, which are disposed on the surface of the body 37 to vary the reflection state of the first and the second laser beams, a first detector 24 and a second detector 25 for detecting the reflected lights of the first and the second laser beams, a filtering device 57 for removing signal components except for the detection signals with respect to signals outputted from the detectors 24 and 25 and a relative processing device 58 for carrying out the relative processing of the output signals from the detectors 24 and 25 to obtain the torque of the body 37.

A laser beam irradiated from the irradiation device 20 is divided into a reflected light and a transmission light by a beam splitter 27 of the first optical transmitter-receiver 61. The reflected light is irradiated to the member 37 via lenses 29 and 31 of the first optical transmitter-receiver 61, a beam splitter 33 and a condensing lens 35. The transmission light enters the second optical transmitter-receiver 62, is reflected on the lens 30 and is irradiated to the measured body 37 via lenses 30, 32, a beam splitter 34 and a condensing lens 36.

Further, in the first optical transmitter-receiver 61, a monitoring camera 63 is arranged as a monitoring means for measuring the position movement of the second optical transmitter-receiver 62. The monitoring camera 63 may be an device which is capable of displaying images, and herein, as the monitoring camera 63, a CCD camera is employed. The second optical transmitter-receiver 62 is provided with a mark 64 for identifying the position movement. As such mark 64, a mark which can be easily identified by the monitoring camera 63 will be adopted, and as the mark 64, an aluminum membrane with a size of lcm in length, 1 cm in width and 1 cm in thickness is used herein. Further, a specific scratch, which is made on the second optical transmitter-receiver 62, may be substituted for the mark 64.

The first and the second reflectors 65 and 66 have a diffusion reflection area for reflecting the light diffusingly and a reflection area for reflecting a light in the same direction as the irradiating direction. The reflection area is composed of a Littrow reflector having a minutely small size, and the diffusion reflection area is composed of a scattering reflection plate having a minutely small size. As a material for the reflection area, anything may be available if it could reflect the light in the same direction as the irradiating direction. Furthermore, as the material for the diffusion reflection area, anything may be available if it could reflect the light diffusingly.

The operation of the torque measuring device according to the fourth embodiment having a structure mentioned above will be explained hereunder.

A laser beam with a beam diameter of 0.65 mm, which is irradiated from the irradiation device 20, is divided into a first laser beam and a second laser beam. A first laser beam is reflected by a beam splitter 27 of the first optical transmitter-receiver 61. The second laser beam transmits through the beam splitter 27 to enter the second optical transmitter-receiver 62.

In the first laser beam approaching the inside of the first optical transmitter-receiver 61, a beam diameter becomes 25 mm by an enlarge optical system of the lenses 29 and 31. The enlarged first laser beam transmits through the beam splutter 33 to take the focus on the surface of the member 37 and to be irradiated so as to have a beam diameter of 1.6 μm.

If the first laser beam is irradiated on the first reflector 65 after being irradiated on the member 37, the first laser beam represents a specific reflected light such that the reflected light and the diffused reflected light are alternately generated. However, except for such reflected light, an amount of the reflected light on the surface of the measured body 37 is extremely small. Accordingly, the first laser beam shows a specific reflected light such that the reflected light and the diffused reflected light are alternately generated only for a predetermined period for every rotation of the member 37 to be measured.

In the state of the reflected light, the reflected light enters the condensing lens 35 through the same light path as that of the radiated light. The beam diameter Φ' of this reflected light is 25 mm. The beam splitter 33 divides the reflected light into two components and one of the divided reflected lights enters the first detector 24. Although this first detector 24 detects this reflected light, in the state of the diffused reflected light, the first detector 24 does not detect the signals. Since such reflected light and diffused reflected light are alternately repeatedly generated, it is possible to obtain the first detection signal 59, which is in shape of a tooth of a comb as same as that in FIG. 9, for every rotation. Since the beam diameter of the first laser beam on the surface of the member 37 is very small as 1.6 μm, the rising time and the lowering time of the first detection signal 59 become about 10 ns.

On the other hand, the second laser beam, which enters the second optical transmitter-receiver 62, is reflected at the right angle by the mirror 28 to be operated in the same way as that of the first laser beam. Then, the second laser beam takes the focus on the surface of the member 37 by an enlarge optical system of the lenses 30 and 32 and the condensing lens 36. After that, the second laser beam is irradiated so that the beam diameter thereof becomes 1.6 $\mu$m. When the second laser beam is irradiated on the diffusion reflection area of the second reflector 66, no reflected light is obtained. However, when the second laser beam is irradiated on the strong reflection area, the reflected light is generated to enter the condensing lens 36 through the same light path as that of the irradiated light. The beam diameter of the reflected light becomes 25 mm by the condensing lens 36. Then, the reflected light is divided by the beam splitter 34 to enter the second detector 25.

Since such a reflected light and a diffused reflected light of the second laser beam are alternately repeatedly generated in the second detector 25, it is possible to obtain a second detection signal 60, which is in a shape of a tooth of a comb as the same as the first detection signal shown in FIG. 9, for every rotation. Since the beam diameter of the second laser beam on the surface of the measured body 37 is very small as 1.6 $\mu$m, the rising and the lowering time of the second detection signal 60 become about 10 ns.

Further, first detection signal 59 and the second detection signal 60 are taken into the filtering device 57 and the relative processing device 58, so that the rotation period and the torque are calculated. In other words, the filtering device 57 converts the first and the second detection signals 59 and 60 into digital values at a sampling frequency of 1 GHz. Since the frequencies of the detection signals 59 and 60, which are detected by the reflectors 65 and 66 to be signal processed, are several kHz, the filtering device 57 removes frequency components with a frequency higher than 50 kHz.

The relative processing device 58 calculates the cross-correlation function of $\Phi(\tau)$ defined by the mathematical expression (6) by using the two first signals 59, which are different in a time factor to obtain the rotation period. As for the torque, it can be obtained through the calculation of the cross-correlation function of $\Phi_t(\tau)$ defined by the mathematical equation (7) by using the first and second detection signals 59 and 60. The calculation results of the cross-correlation function of $\Phi(\tau)$ and $\Phi_t(\tau)$ are the same as those in the third embodiment. The rotation period and the torque are the same as those in the third embodiment.

The monitoring camera 63, which is arranged on the first optical transmitter-receiver 61, monitors the position movement of the mark 64, which is provided on the second optical transmitter-receiver 62. Further, by monitoring the position movement of the mark 64, it is possible to detect the change of the positional relationship between the first optical transmitter-receiver 61 and the second optical transmitter-receiver 62 owing to the impact or the vibration from the ambient environment. If the first optical transmitter-receiver 61 and the second optical transmitter-receiver 62 are suffered from the vibration or impact, the rotation rate and the torque are not indicated on the relative processing device 58, but the relative processing device 58 indicates the detection of the vibration or impact.

On the other hand, in order to correct the variation of the positional relationship, it is necessary to calculate the cross-correlation function of $\Phi_t(\tau)$ defined by the mathematical equation (7) by using the first and second detection signals 59 and 60. Accordingly, the delay time upon receiving the vibration and the impact can be obtained. This delay time is not generated by the load device 38, but is generated by the variation of the positional relationship of the first optical transmitter-receiver 61 and the second optical transmitter-receiver 62 owing to the vibration and the impact. As a result, the delay time (time delay) of $\tau'$ is generated. Therefore, when the positional relationship is varied, it is necessary to calculate the cross-correlation function of $\Phi_t(\tau)$ defined by the mathematical equation (7) to obtain the delay time of $\tau'$. Then, according to the following mathematical equation (8), in which the influence of the delay time of $\tau'$ generated by the variation of the positional relationship is considered, the torque, $F_t$ is obtained.

(Mathematical Equation 8)

$$F_t = 2\pi K \cdot (\tau - \tau')/T \qquad (8)$$

K: constant of twisted spring of member 37
T: rotation period of member 37

Further, by arranging a plurality of the torque measuring devices according to the present invention along the axial direction, the positional variation of the rotation rate and the torque in an axial direction can be measured.

Thus, according to the present invention, the first and the second laser beams are transmitted through a space and irradiated on the body 37 to be measured. Both of the beam diameters of the first and the second laser beams are 1.6 $\mu$m on the surface of the body 37. The first optical transmitter-receiver 61 and the second optical transmitter-receiver 62 detect the reflected lights, so that the reflectors 65 and 66 can obtain the first and the second detection signals 59 and 60. By the reflectors 65 and 66, the reflected light and the diffused reflected light are repeatedly generated by turn. The first and the second detection signals 59 and 60 are in a shape of a tooth of a comb with a very short rising and lowering time of about 10 ns as shown in FIG. 9.

The filtering device 57 removes noise components with a frequency higher than 50 kHz, with respect to the first and the second detection signals 59 and 60. Therefore, even under the noise environment, the rising and the lowering time is of about 10 ns.

The relative processing device 58 carries out the relative processing of the first detection signal 59 or the second detection signal 60 to measure the rotation period of the member 37 for every rotation at a high accuracy as shown in FIG. 11. The first and the second detection signals 59 and 60 are in an intricate shape of a tooth of a comb with very short rising time and lowering time of about 10 ns. The relative processing device 58 also carries out the relative processing of the first detection signal 59 and the second detection signal 60 to obtain the delay time as shown in FIG. 13. Then, the relative processing device 58 can obtain the torque for every rotation of the member 37 at a predetermined high accuracy by using this delay time and the mathematical equation (1).

The monitoring camera 63 and the mark 64 can detect the position movement of the first optical transmitter-receiver 61 and the second optical transmitter-receiver 62 owing to the vibration or impact from the ambient environment so as to reduce the deterioration of the measuring accuracy due to the position movement according to the mathematical equation (8).

The torque measuring device according to the present invention can measure the positional variation of the rotation rate and the torque in an axial direction, since it is possible to arrange a plurality of the torque measuring devices in an axial direction.

[Embodiment 5]

Figure 16:
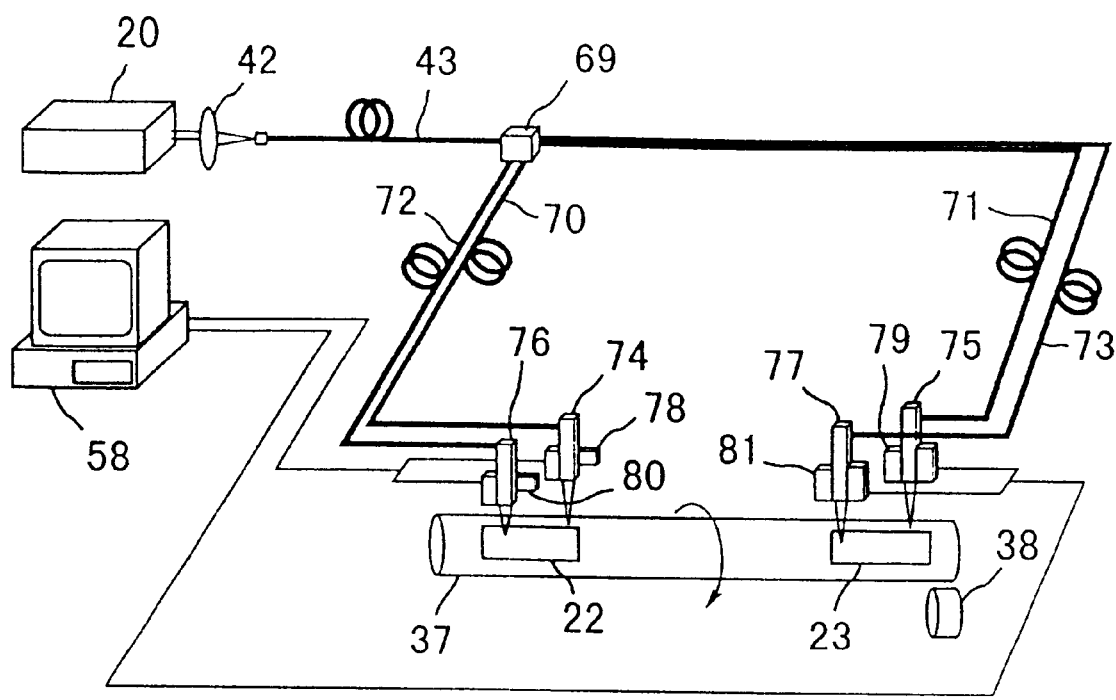
FIG. 16 is a diagram illustrating a fifth embodiment of a torque measuring device according to the present invention.

FIG. 16 is an illustration of a fifth embodiment of a torque measuring device according to the present invention.

As shown in FIG. 16, the torque measuring device substantially comprises an irradiation device 20 for irradiating a laser beam, a lens 42 to enter the laser beam in an optical fiber 43, a multiple branch connector 69 for branching the laser beam which enters the optical fiber 43, optical fibers 70, 71, 72 and 73, which are connected to the multiple branch connector 69, a first, a second, a third and a fourth optical transmitter-receivers 74, 75, 76 and 77, which are connected to these optical fibers 70 through 73, respectively, first and second reflectors 22 and 23, which are disposed on the surface of the body 37 to vary the reflection state of the laser beam and a relative processing device 58 for carrying out the relative processing of each detection signal for each laser beam, which are branched to the optical fibers 70 through 73 to obtain the torque of the measured body 37.

The optical fibers 70, 71, 72 and 73 comprise the same optical fiber as the optical fiber 43. It is assumed that the optical fibers 70, 71, 72 and 73 are SI type single mode and comprise quarts fibers with a core diameter $\Phi_f$ of 5 $\mu$m and a numerical aperture of 0.11. The multiple branch connector 69 to branch an optical fiber light is composed of a prism so as to branch the optical fiber light in the four directions.

The first through fourth transmitter-receivers 74 through 77 are composed of the first optical transmitter-receiver 61, which is provided with a beam controlling means and a detecting means for detecting the reflected light of the irradiated light beam. The rotation rate and the torque of the measured body 37 are measured by first and second measuring systems. The first measuring system is composed of the first transmitter-receiver 74 or the second transmitter-receiver 75. The second measuring system is composed of the third transmitter-receiver 76 and the fourth transmitter-receiver 77. The first and the second measuring systems are disposed in the circumferential direction of the measured body 37. Further, a plurality of the transmitter-receivers 74 through 77 are disposed in the circumferential direction to measure the rotation rate and the torque by the multiple systems. In this embodiment, two systems are employed, because any number of the systems may be applied according to the operational principle.

The first transmitter-receiver 74 and the third transmitter-receiver 76 are provided with an LED 78 and an LED 80. Further, in order to detect the positional variation of the LED lights, the second transmitter-receiver 75 and the fourth transmitter-receiver 77 are provided with position sensors 79 and 81 as positional variation measuring means. The second transmitter-receiver 75 and the fourth transmitter-receiver 77 are positioned to be opposed to each other, and the position sensors 79 and 81 are two-dimensional sensors. In the present invention, although the infrared LEDs are employed as the LEDs 78 and 80, it is not necessary to limit the LED of the transmitter-receiver to the infrared LED.

The operation of the torque measuring device according to the fifth embodiment of the structure mentioned above will be explained hereunder.

The laser beam with a beam diameter of 0.65 mm, which is irradiated from the irradiation device 20, enters the optical fiber 43 by the lens 42. This laser beam is branched into the optical fibers 70, 71, 72 and 73 by the multiple branch connector 69.

The first laser beam, which is branched into the optical fiber 70, enters the first optical transmitter-receiver 74. The first optical transmitter-receiver 74 operates upon the first laser beam in the same way as that in the transmitter-receiver 61, i.e., the first laser beam is irradiated so as to take the focus on the surface of the member 37 to obtain a beam diameter of 2.2 $\mu$m. As a result, the first optical transmitter-receiver 74 can obtain the detection signal of the reflector 22 for every rotation of the member 37. The detection signal of the first laser beam comprises a pulse signal having a rising time of about 10 ns as shown in FIG. 2.

On the other hand, the second laser beam, which is branched into the optical fiber 75, enters the second optical transmitter-receivers 75. The second optical transmitter-receiver 75 operates upon the second laser beam in the same way as that in the first transmitter-receiver R 74. As a result, the second optical transmitter-receiver 75 can obtain the detection signal of the reflector 23 for every rotation of the body 37. The detection signal of the second laser beam comprises a pulse signal having a rising time of about 10 ns as shown in FIG. 2.

The relative processing device 58 operates (calculates) the mathematical equations (1), (6) and (7) by using the detection signals of the first and second laser beams, so that the relative processing device 58 can obtain the rotation rate $V_1$ and the torque $F_1$ by the first measuring system which is composed of the first transmitter-receiver 74 and the second transmitter-receiver 75.

Furthermore, the third transmitter-receiver 76 and the fourth transmitter-receiver 77 operate upon the third and the fourth laser beams, which are branched by the optical fibers 72 and 73, in the same way as that mentioned above. As a result, the relative processing device 58 can obtain the rotation rate $V_2$ and the torque $F_2$ by the second measuring system.

Further, the relative processing device 58 carries out an average processing for the rotation rates $V_1$, $V_2$ and the torques $F_1$, $F_2$, which are obtained by the first and the second measuring systems, respectively, so that the relative processing device 58 obtains the rotation rate $V_{ave}$ and the torque $F_{ave}$. The average processing is shown in a mathematical equations (9) and (10) with the number of systems n=2.

(Mathematical Equation 9)

$$V_{ave} = \left(\sum_{k=1}^{n} v_k\right)/k \quad (9)$$

(Mathematical Equation 10)

$$F_{ave} = \left(\sum_{k=1}^{n} F_k\right)/k \quad (10)$$

The position sensors 79 and 81, that are disposed on the second transmitter-receiver 75 and the fourth transmitter-receiver 77, detect the light irradiated from the LEDs 78 and 80, which are disposed on the first and third optical transmitter-receivers 74 and 76. The position sensors 79 and 81 can detect the positional change of the irradiated light. Accordingly, when the vibration or impact occurs by the ambient environment, the position sensors 79 and 81 can detect the positional variation between the first optical transmitter-receiver and the second optical transmitter-receiver and between the third optical transmitter-receiver and the fourth optical transmitter-receiver. Further, when the vibration or impact occurs, the rotation rate and the torque are not displayed by the relative processing device 58, but the detection of the vibration or the impact is displayed.

When the positional relation is changed, the delay time τ' owing to the positional variation can be obtained through the calculation of the cross-correlation function of $\Phi_i(\tau)$ by the first and second measuring systems, respectively, and the cross-correlation function of $\Phi_i(\tau)$ is defined in the mathematical equation (7). According to the mathematical equation (8), the torque $F_1$ by the first measuring system and the torque $F_2$ by the second measuring system can be obtained. Thus, the torque $F_{ave}$ can be obtained by the average processing by the mathematical equation (10).

As described above, according to this fifth embodiment, it is possible to transmit the laser beam of the irradiation device 20 into the inside of a device to be measured and the narrow portion by the optical fibers 43, 70, 71, 72 and 73. The first, second, third and fourth laser beams are transmitted through the fibers to be irradiated on the measured body 37. Then, the first, second, third and fourth laser beams take the focus on the surface of the member 37 so as to provide diameters of 2.2 μm. The first through fourth optical transmitter-receivers 74 to 77 detect the reflected lights of the first through the fourth laser beams. As a result, owing to the reflectors 22 and 23, which are disposed on the member 37, the respective optical transmitter-receivers can obtain the detection signals in a pulse shape with a rising time of about 10 ns as shown in FIG. 2.

The relative processing device 58 calculates the cross-correlation function of $\Phi(\tau)$, which is defined in the mathematical equation (6), to calculate the rotation rate, which is obtained from the respective optical transmitter-receivers. Further, the relative processing device 58 carries out the average processing represented by the mathematical equation (9), so that the relative processing device 58 can calculate the rotation period of the member 37 at a predetermined high accuracy for every rotation thereof. The relative processing device 58 also calculates the cross-correlation function of $\Phi_i(\tau)$, which is represented by the mathematical equation (7) and carries out the average processing represented by the mathematical equation (10), so that the relative processing device 58 can calculate the torque of the member 37 at a predetermined high accuracy for every rotation thereof.

Further, according to the LEDs 78, 80 and the position sensors 79, 81, it is possible to detect the positional variation of the first to fourth optical transmitter-receivers 74 to 77 owing to the vibration or impact from the peripheral environment. Depending on the mathematical equations (8) and (10), the positional variation is corrected and the average processing is carried out. Therefore, it is possible to reduce the deterioration of the measuring accuracy of the torque by the positional variation of the optical transmitter-receiver.

Further, by arranging a plurality of the torque measuring devices according to the present invention along the circumferential direction of the member 37 to be measured, the average value processing of the torque value, which is measured by respective devices, can be made. Accordingly, it is possible to improve the accuracy for measurement of the torque.

[Embodiment 6]

FIGS. 17 to 23 represent a sixth embodiment of a torque measuring device according to the present invention.

Figure 17:
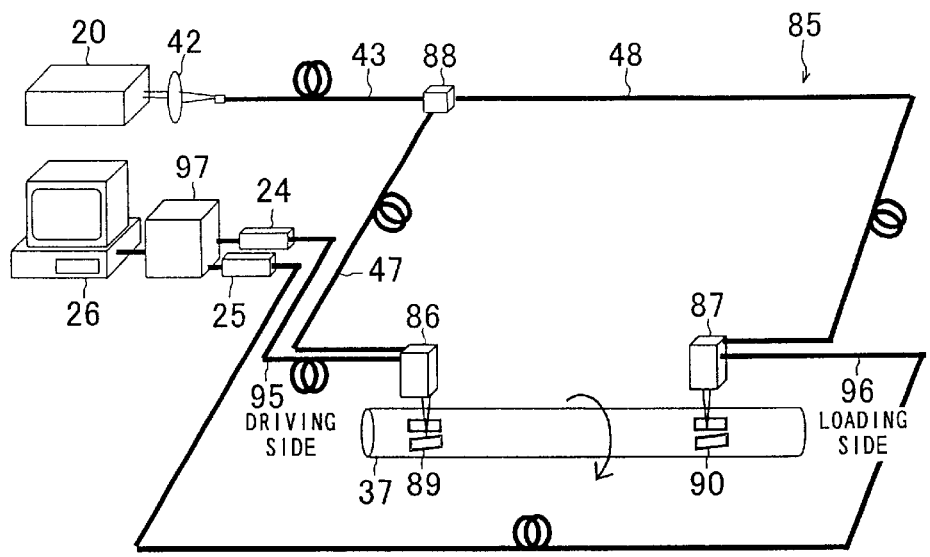
FIG. 17 is a diagram illustrating a sixth embodiment of a torque measuring device according to the present invention.

As shown in FIG. 17, the torque measuring device according to the sixth embodiment of the present invention substantially comprises an irradiation device 20 for irradiating a light, an optical transmitter 85 for branching the light from the irradiation device 20 and transmitting the branched lights as beams, a first beam controller 86 and a second beam controller 87 for controlling the beam diameters of the first and the second lights and irradiating them to a member or body 37 to be measured, a first detector 24 and a second detector 25 for detecting the intensity variation of the reflected lights of the first and second lights and a signal processor 26 for calculating the torque of the body 37 based on signals outputted from the detectors 24 and 25.

The optical transmitter 85 comprises a lens 42 for entering the light irradiated from the irradiation device 20 into an optical fiber 43, a branch device 88 for transmitting the light through the optical fiber 43 and branching the transmitted light into the first and second lights, an optical fiber 47 for transmitting the first branched light to the first beam controller 86 and an optical fiber 48 for transmitting the second branched light to the second beam controller 87.

The irradiation device 20 comprises a light source for irradiating a directional light. In the present embodiment, the light source is defined as a He—Ne laser in $TEM_{00}$ mode, which radiates sequential light of an output of 10 mV with a wavelength of 632.8 nm. Various lasers, LEDs and lamps which are capable of irradiating the strong light in a specific direction may be used as an irradiation device.

As the lens 42, through which the light irradiated from the irradiation device 20 enters into the optical fiber 43, any optical elements, such as a spherical lens, a non-spherical lens, a composite lens or a combined lens made of a plurality of lenses and a refractive index distribution lens may be available, as far as the He—Ne laser be collected. In the same way, as the branching device 88, any optical elements, which are capable of branching the He—Ne laser may be available. With respect to the optical fiber 43, any optical elements, which are capable of transmitting the He—Ne laser with a wavelength of 632.8 nm, may be available.

On the other hand, when the irradiation device 20 is altered, it is necessary for the lens 42, the optical fiber 43 and the branching device 88 to be properly selected. The first and second beam controllers 86 and 87 are constituted so as to control the beam diameters of the first and second branched lights and irradiate the first and second branched lights to the first and second reflectors 89 and 90.

Figure 18:
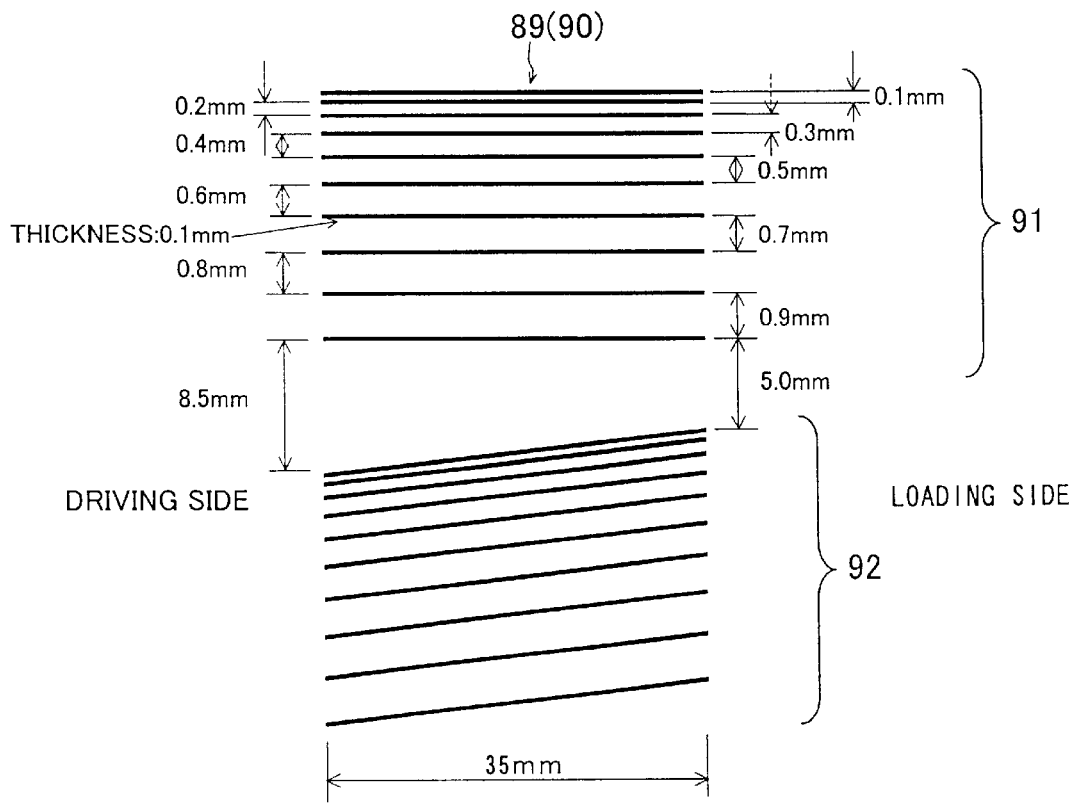
FIG. 18 is an explanatory view for showing a first reflector and a second reflector shown in FIG. 17.

The first and second reflectors 89 and 90 are disposed in a reflecting portion (area) in which its shape is changed in the axial direction of the member 37 as shown in FIG. 18. The first reflector 89 and the second reflector 90 form a reflecting pattern from an upper bar code portion 91, which is in parallel with a rotation axis of the member 37 and a lower bar code portion 92 having a predetermined angle with respect to the rotation axis. At a loading side of the lower bar code portion 92, a spacing (distance) to the upper bar code portion 91 is the narrowest, i.e., 5.0 mm. On the other hand, at a driving side of the lower bar code 92, the spacing to the upper bar code 91 is the widest, i.e., 8.5 mm.

Further, since the length of the lower bar code 92 is 35 mm, the first reflector 89 and the second reflector 90 are composed such that, by moving from the loading side to the driving side by 1 mm, the spacing (distance) between the upper bar code 91 and the lower bar code portion 92 can be widened by 1 mm. In other words, on the assumption that a starting point is located on the loading side and the left in the axial direction is determined as positive, the spacing (distance) L mm between the upper bar code 91 and the lower bar code portion 92, which is at the distance X mm from the starting point can be expressed from the following mathematical equation (11).

(Mathematical Equation 11)

$$L = 0.1 \cdot X + 5.0 \qquad (11)$$

The change of the shape in the axial direction of the first and second reflectors 89 and 90 shown in FIG. 18 is not limited to this sixth embodiment, but any change of the shape may be available, if the shape of a position in the axial direction can be determined uniquely by considering the shape changes in the axial direction.

On the other hand, each bar code line forming the upper bar code portion 91 has a thickness of 0.1 mm and a length of 35 mm as shown in FIG. 18. The number of bar code lines is 10 and the spacing of the lines becomes sequentially wider from 0.1 mm to 0.9 mm every for 0.1 mm. Further, the lower bar code portion 92 has the same construction as that of the upper bar code portion 18 except that the lower bar code portion 92 keeps a predetermined angle with the rotation axis of the member 37. The ten (10) bar code lines may have any spacing if a repeated pattern does not occur. Further, if the repeated pattern does not occur, the thickness and the number of the bar code may be changeable. On the other hand, the length of the bar code is determined to be longer than the amount of movement in the axial direction of the member 37, which will occur during the rotation thereof. It is then determined that the bar code line does not reflect the first light irradiated from the first beam controller 86.

The first and second reflectors 89 and 90 shown in FIG. 18 form directly a reflecting pattern in the body 37 by processing a surface portion thereof with a marking system, a printing system and an etching system or the like.

Figure 19:
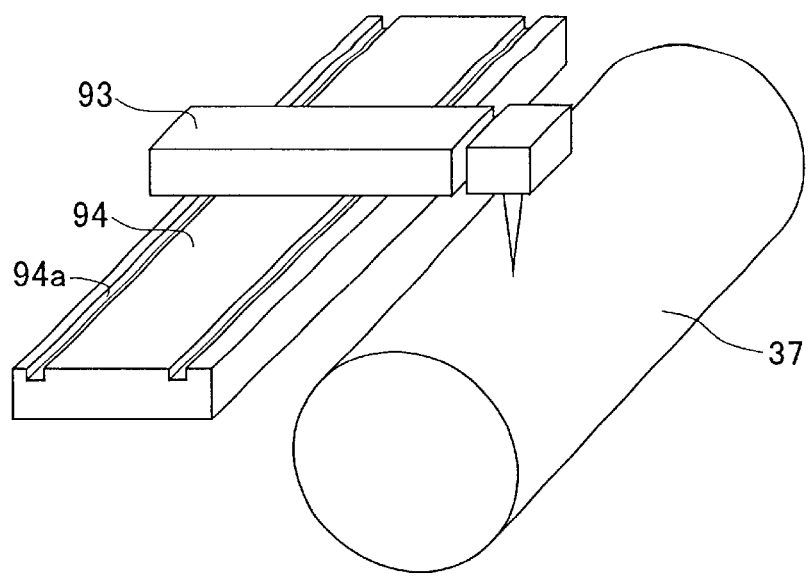
FIG. 19 is a perspective view showing a device constituting the first reflector and the second reflector shown in FIG. 17.

In the marking system, the surface of the member 37 is reformed to make the reflectors 89 and 90. For example, upon making the reflectors 89 and 90 by a laser marking device, a laser marking device 93 is loaded on a moving device 94, which is equipped in parallel with the member 37 as shown in FIG. 19. Since the laser marking device 93 is formed to be movable in parallel with the member 37 along a guide groove 94a formed on the upper portion of the moving device 94, the laser marking device 93 moves the reflectors 89 and 90 to the driving side and the loading side and marks the reflectors 89 and 90 shown in FIG. 18 on the surface of the member 37, respectively.

As the laser marking device 93, a $CO_2$ laser or YAG laser may be employed. In principal, the laser marking device 93 irradiates in spots a laser beam on the surface of the member 37, reforms the surface and scans the laser beam so as to make a bar code line. Further, the length of the moving device 94 is determined according to the size of the member 37, and when the size thereof is small, the moving device 94 is not necessary. Further, methods of reforming the surface of the member 37 and making the reflectors 89 and 90 are all included in this marking system.

When the reflectors 89 and 90 are made by the printing system, the laser marking device 93 is replaced with a printing device. This printing device makes a bar code line through a laser scanning while performing a spraying coating of compositions and ink or the like on the surface of the member 37. Further, methods of adhering the substance on the surface of the measured body 37 and making the reflectors 89 and 90 are all included in this printing system.

In the etching system, the reflectors 89 and 90 are made by scraping the surface of the member 37. For example, the laser marking device 93 shown in FIG. 19 is replaced with a processing laser device. This processing laser device makes a bar code line by irradiating in spots the laser beam on the surface of the member 37 and then scraping the surface thereof. Since the distance from the beam controllers 86 and 87 changes and the above-stated bar code line is turned off from the focus, the reflected light becomes weak to be a low reflection area. The etching system includes a dry etching system and a chemical etching system. Further, systems to make the reflector 89 and 90 by scraping the surface of the member 37 are all included in this etching system.

As shown in FIG. 17, the first detector 24 is composed of an avalanche photodiode of a type to output an electric signal having a positive-negative inversion. The first detector 24 transmits the reflected light of the first light, which is received by the first beam controller 86 and reflected by the first reflector 89. The first detector 24 is connected to a first optical fiber 95, which constitutes an optical transmitter 85. In the same way, the second detector 25 is also composed of the avalanche photodiode of a type to output an electric signal having a positive-negative inversion. The second detector 25 transmits the reflected light of the second light, which is received by the second beam controller 87 and reflected by the second reflector 90. The second detector 25 is connected to a second optical fiber 96, which constitutes an optical transmitter 85. Further, any type of the optical converter is available for the first and second detectors 24 and 25 as far as being an optical converter such as photmultiplier tube or a photodiode.

The first detector 24 and second detector 25 are connected to an AD converter 97. The AD converter 97 converts an analog electric signal outputted from the first and second detectors 24 and 25 into digital data and transmits the digital data to the signal processor 26. The signal processor 26 processes a signal outputted from the AD converter 97. Further, any calculator is available for the signal processor 26 as far as it receives an output signal from the AD converter 97.

The torque measuring device of the sixth embodiment of the structure mentioned above will operates as follows.

The measured body 37 comprises a transmission shaft between the driving side and the loading side. It is assumed that the diameter of the transmission shaft is 800 mm, the rotation rate is 3000 rpm and the circumferential rate (peripheral speed) is 125 m/s. The member or body 37 to be measured comprises the first reflector 89 at the driving side and the second reflector 90 at the loading side to obtain the torque of a driving source by measuring a shaft torsion, which occurs at the transmission shaft. Further, the measured body 37 can obtain, not only the torque, the rate and the accelerated rate of the rotational axis.

The body 37 to be measured comprises a rotational axis for moving objects having a driving unit and a loading unit such as a vehicle, a vessel and a train or the like and machines such as a generator, an electric motor and a general motor or the like. The measured body 37 is not limited to the diameter of the rotational rate and the transmission shaft. In such applicable objects, the rotational axis sometimes moves in the axial direction during the rotation of the body 37 and many of them are under conditions with high temperature, high humidity, coarse particles and strong wind.

Since the first reflector 89 and the second reflector 90 are applied through a direct marking process on the surface of the member 37, even under the above conditions, the first reflector 89 and the second reflector 90 are not exfoliated from the member 37 during the rotation thereof.

The laser beam irradiated from the irradiation device 20 is collected by the lens 42 and enters into the optical fiber 43. The light is then branched into the first and second lights (laser beams) by the branching device 88.

Figure 20:
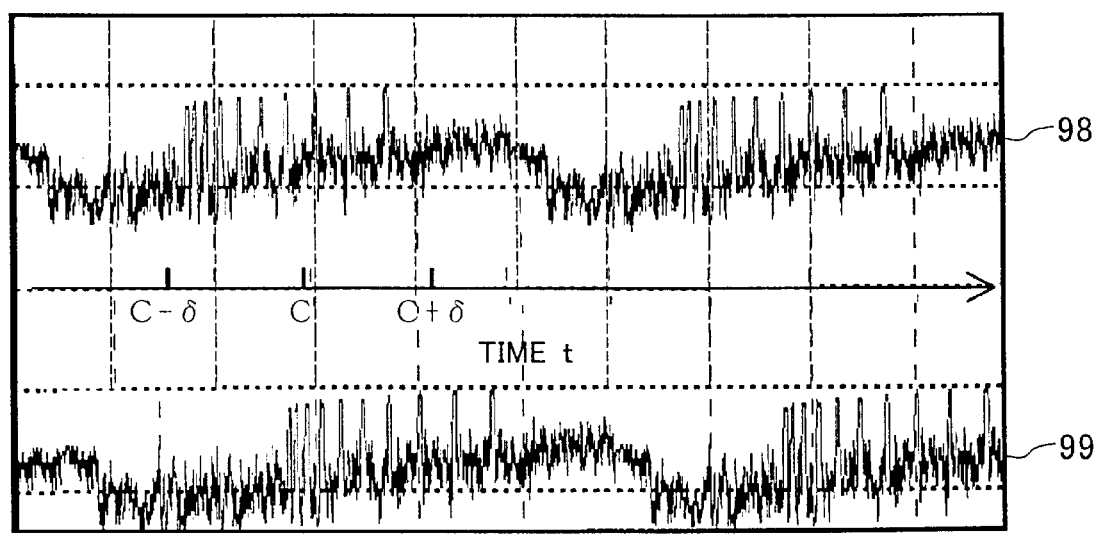
FIG. 20 is a graph showing measured waveforms, which is obtained from the sixth embodiment.

At first, the first laser beam is transmitted to the first beam controller 86 through the optical fiber 47. Then, the first beam controller 86 controls the first laser beam so as to provide a beam diameter of 5 µm on the surface of the member 37 to be irradiated thereto. The first laser beam irradiated to the member 37 is not reflected when irradiated to the bar code line of the first reflector 89. However, in other cases, the first beam is strongly reflected. The reflected first laser beam is returned to the beam controller 86, then transmitted through the first optical fiber 95 and detected by the first detector 24. Therefore, when the member 37 is rotating, the bar code of the first reflector 89 and a first detecting signals 98 with the same shapes are obtained for every rotation in the first detector 24 as shown in FIG. 20.

On the other hand, the second laser beam is also affected by the same effect as that in the above-mentioned first laser beam. Accordingly, the second detector 25 can obtain the bar code of the second reflector 90 and a second detecting signal 99 with the same shapes for every rotation as shown in FIG. 20. Then, the first detecting signals 98 and the second detecting signals 99 are converted into the digital data by the AD converter 97 to be transmitted to the signal processor 26.

This signal processor 26 carries out the correlative calculation by using a waveform at the left side, which is a waveform of the upper bar code portion 91 to obtain the rotation period of the member 37.

Therefore, according to the mathematical equation (12), where a delay time τ is determined as a parameter, the left side waveform of the first detecting signal 98 in a case of the t=C and the correlative function Φ(τ) related to the left side waveform of the first detecting signal 98 after one rotation are calculated. The delay time τ as a parameter may be approximately 20 ms ±several ms and it may not be limited to the range of 15 ms<τ<25 ms.

(Mathematical Equation 12)

$$\Phi(\tau) = 1/2\delta \cdot \sum_{t=C-\delta}^{t=C+\delta} F(t+\tau) \cdot F(t) \quad 15 \text{ [ms]} < \tau < 25 \text{ [ms]} \tag{12}$$

F(t): digital data value of first detecting signal 98 at time t

Figure 21:
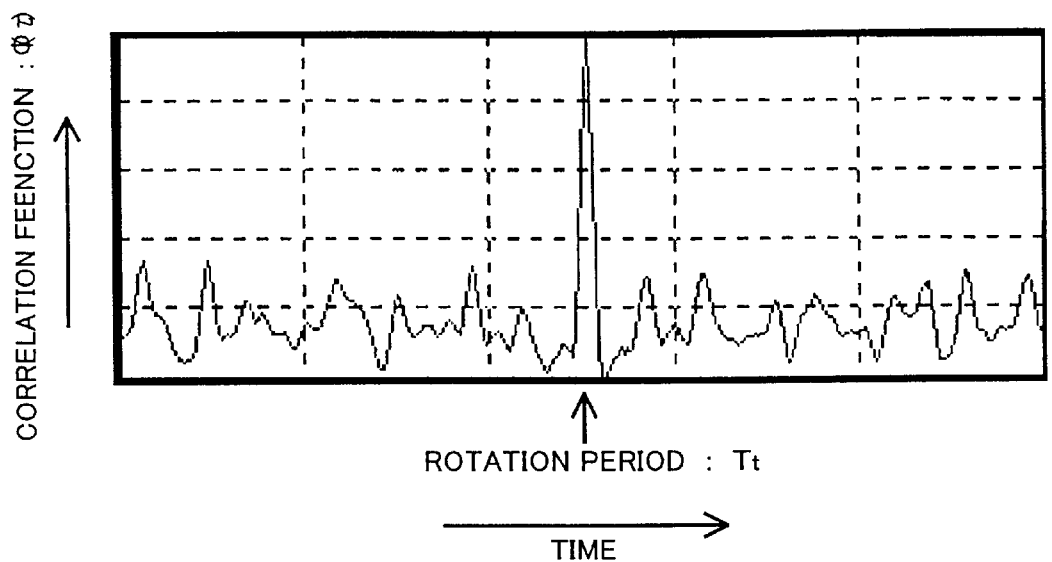
FIG. 21 is a graph showing a calculation processing result of a rotation period, which is obtained from the sixth embodiment.

2δ: time width to be correlatively calculated The result obtained from the calculation of a cross-correlation function of Φ(τ) is shown in FIG. 21, in which the cross-correlation function of Φ(τ) has only one high and sharp peak. The left side waveform of the first detecting signal 98 where time t=C and the left side waveform of the first detecting signal 98 after one rotation have the same shape each other. Therefore, the delay time τ, where the cross-correlation function of Φ(τ) takes the highest value, becomes a rotational period $T_r$. Further, the rotational period $T_r$ can be obtained by the second detecting signal 99.

Next, in the signal processor 26, the correlative calculation is carried out by using the left side wave forms of the first detecting signal 98 and the second detecting signal 99 to obtain the torque of the driving source of the body 37.

On this account, according to the mathematical equation (13), the cross-correlation function of $\Phi_i(\tau)$ with respect to the left side waveform of the first detecting signal 98 at the time t=C and the left side waveform of the second detecting signal 99 in the same rotation of the first detecting signal 98 is calculated, where the delay time τ is determined as a parameter. With respect to the range of the delay time τ as a parameter, it may be a range including a measured time difference between the left side waveform of the first detecting signal 98 and the left side waveform of the second detecting signal 99 in the same rotation of the first detecting signal 98 with ±several ms. It may not be limited to 0 ms<τ<1 ms.

(Mathematical Equation 13)

$$\Phi_i(\tau) = 1/2\delta \cdot \sum_{t=C-\delta}^{t=C+\delta} G_1(t) \cdot G_2(t+\tau) \quad 0 \text{ [ms]} < \tau < 1 \text{ [ms]} \tag{13}$$

Figure 22:
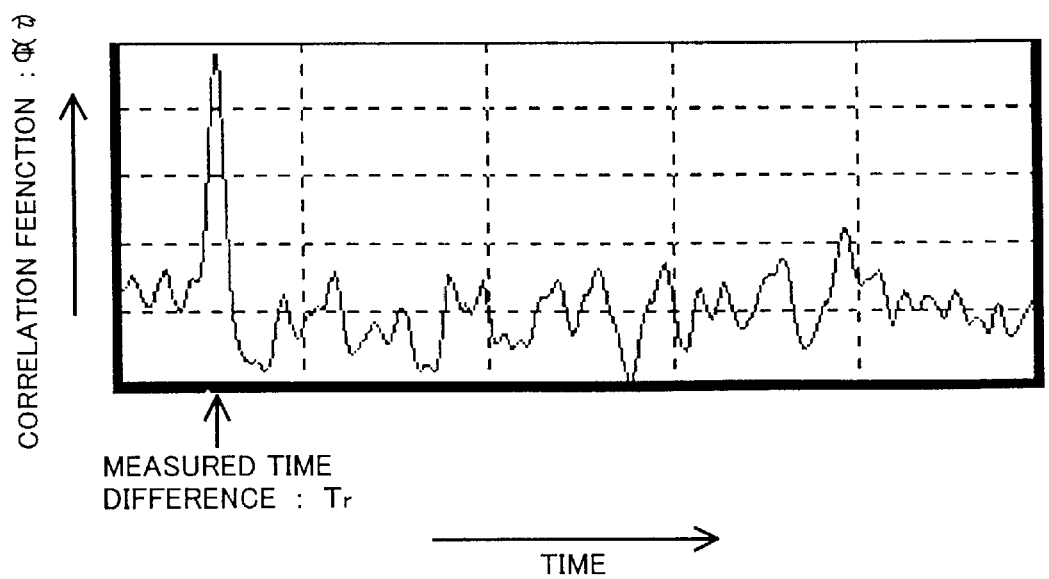
FIG. 22 is a graph showing a calculation processing result of a measuring time difference, which is obtained from the sixth embodiment.

$G_1$: digital data value of first detecting signal 98 at time t $G_2$: digital data value of second detecting signal 99 at time t The result obtained from the calculation of a cross correlation function of $\Phi_i(\tau)$ is shown in FIG. 22. As shown in FIG. 22, the cross-correlation function of $\Phi_i(\tau)$ has only one high and sharp peak. The left side waveform of the first detecting signal 98 where time t=C and the left side waveform of the second detecting signal 99 in the same rotation of the first detecting signal 98 have the same shape each other. Therefore, since a measured time difference becomes 0 (zero) if no loading is added, the delay time τ, where the cross-correlation function of $\Phi_i(\tau$ takes the highest value, becomes a measured time difference $T_r$ therebetween, which is generated by the torque.

Since the upper bar code portion 91 of the first and second reflectors 89 and 90 is in parallel with a rotational axis of the member 37, the measured time difference $T_r$ therebetween does not have an error, but have a constant value, even in the movement in the axial direction during the rotation of the member 37.

The torque $F_t$ of the measured body 37 can be obtained from the mathematical equation (14) by using the above measured time difference $T_r$ and the rotational period $T_r$.

(Mathematical Equation 14)

$$F_t = k \cdot 360 \cdot T_r / T_t \tag{14}$$

k: torsional rigidity of body 37 [Nm/deg.]

Next, in the signal processor 26, the correlative calculation is carried out by using the left side waveform and the right side waveform of the first detecting signal 98 to specify the irradiation position of the first laser beam on the surface of the measured body 37.

On this account, according to the mathematical equation (14), the cross-correlation function of Φ(τ) with respect to the left side waveform and the right side waveform of the first detecting signal 98 at time t=C is calculated, where the delay time τ as a parameter ranges in 0 ms<τ<0.5 ms.

Figure 23:
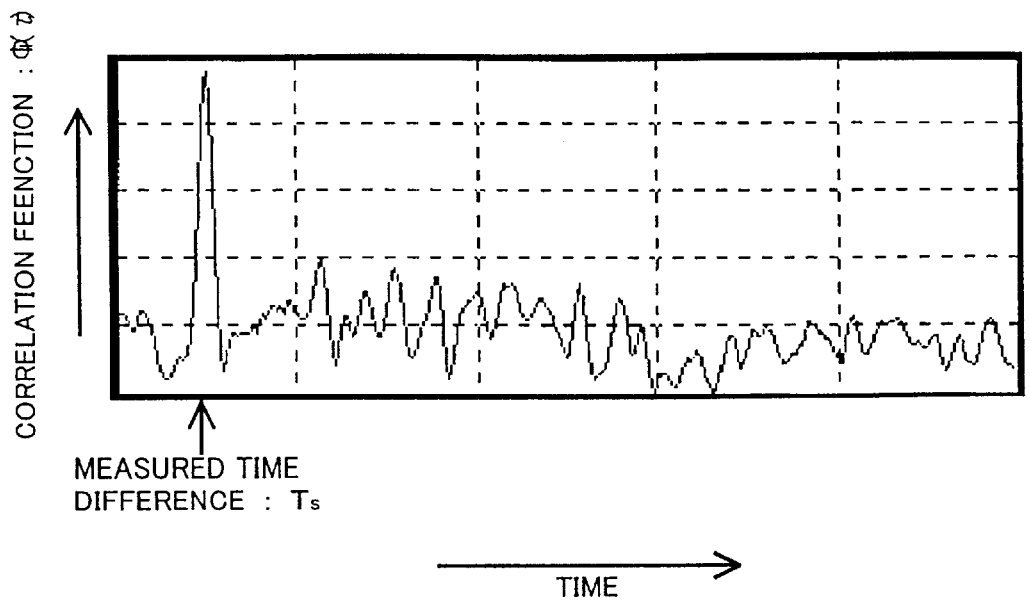
FIG. 23 is a graph showing a calculation processing result of another measuring time difference, which is obtained from the sixth embodiment.

The result obtained from the calculation of the cross-correlation function of Φ(τ) is shown in FIG. 23, in which the cross-correlation function of $\Phi_i(\tau)$ has only one high and sharp peak. The left side waveform and the right side waveform of the first detecting signal 98 where time t=C have the same shape each other. Therefore, the delay time τ, where the cross-correlation function of Φ(τ) takes the highest value, becomes a measured time difference $T_s$ between the left side waveform and the right side waveform of the first detecting signal 98.

Since the upper bar code portion 91 of the first reflectors 89 is in parallel with a rotational axis of the member 37 and the lower bar code portion 92 of the first reflector 89 has a predetermined angle to the rotation axis, the measured time difference $T_s$ does not have an error but have a constant value, even when there is a movement in the axial direction during the rotation of the member 37.

Since the spacing (distance) between the left side waveform and the right side waveform of the first detecting signal 98 can be obtained by calculating a product of the measured time difference $T_s$ and the circumferential rate of the measured body 37, a distance Xmm, which indicates an irradiation position of the first laser beam can be obtained by the mathematical equation (11). Further, by recording the change in the irradiation position of the first laser beam, the moving amount in the axial direction and the moving direction of the body 37 can be obtained. In the same way, the correlative calculation is carried out by using the left side waveform and the right side waveform of the second detecting signal 99 to specify the irradiation position of the second laser beam on the surface of the measured body 37.

As mentioned above, according to the present embodiment, each of the first and the second reflectors 89 and 90 has a structure of a bar code so that the cross-correlation function of $\Phi(\tau)$ of the rotational period $T_t$ with only one high and sharp peak as shown in FIG. 21 and the cross-correlation function of $\Phi_t(\tau)$ of the measured time difference $T_r$ with only one high and sharp peak as shown in FIG. 22 can be obtained. Therefore, even when a noise and a performance decrement are generated in the torque measuring device of the present embodiment and the noise is superposed on the cross-correlation function of $\Phi(\tau)$ of the rotational period $T_t$ and the cross-correlation function of $\Phi_t(\tau)$ of the measured time difference $T_r$, the rotational period $T_t$ and the measured time difference $T_r$ are obtained with a high accuracy. Further, according to the mathematical equation (14), the torque can be obtained with a high accuracy.

A distance between the left side waveform and the right side waveform of the first detecting signal 98 or the second detecting signal 99 can be obtained and the irradiation position of the first or second laser beam in the axial direction can be obtained by allowing the distance between the upper bar code portion 91 and the lower bar code portion 92 to be a reflecting portion to be expressed by the mathematical equation (11). Further, by recording the change in the irradiation position of the first or second laser beam, the moving amount in the axial direction and the moving direction of the member 37 is obtained.

Further, the first reflector 89 and the second reflector 90 are formed by applying a direct marking working on the surface of the member 37, so that the upper bar code portion 91 of the first and second reflectors 89 and 90 can be kept in parallel with the rotational axis of the body 37. On the other hand, the lower bar code portion 92 of the first and the second reflectors 89 and 90 can keep a predetermined angle to the rotational axis of the member 37. Therefore, the measured time difference $T_r$ for obtaining the torque of the member 37 and the measured time difference $T_s$ for obtaining the moving amount in the axial direction and the moving direction do not provide errors, even in the movement in the axial direction during the rotation of the member 37.

Accordingly, even in the movement in the axial direction during the rotation of the member 37, the torque thereof, the moving amount in the axial direction and the moving direction can be obtained by the mathematical equation (11) and (14) with a high accuracy. In this case, since the accuracy in the measurement has a torque measuring time error of 0.5%, i.e., a measuring angle of $6.8 \times 10^{-4}$ deg and a measuring time error of the measuring device by using an eddy current sensor is 5 to 10%, it becomes possible to extremely improve the measuring accuracy. Further, it is possible to prevent the first and the second reflectors 89 and 90 from being detached from the member 37 by a use condition and an ambient condition of the member 37.

[Embodiment 7]

FIGS. 24 to 28 represent a seventh embodiment according to the present invention.

Figure 24:
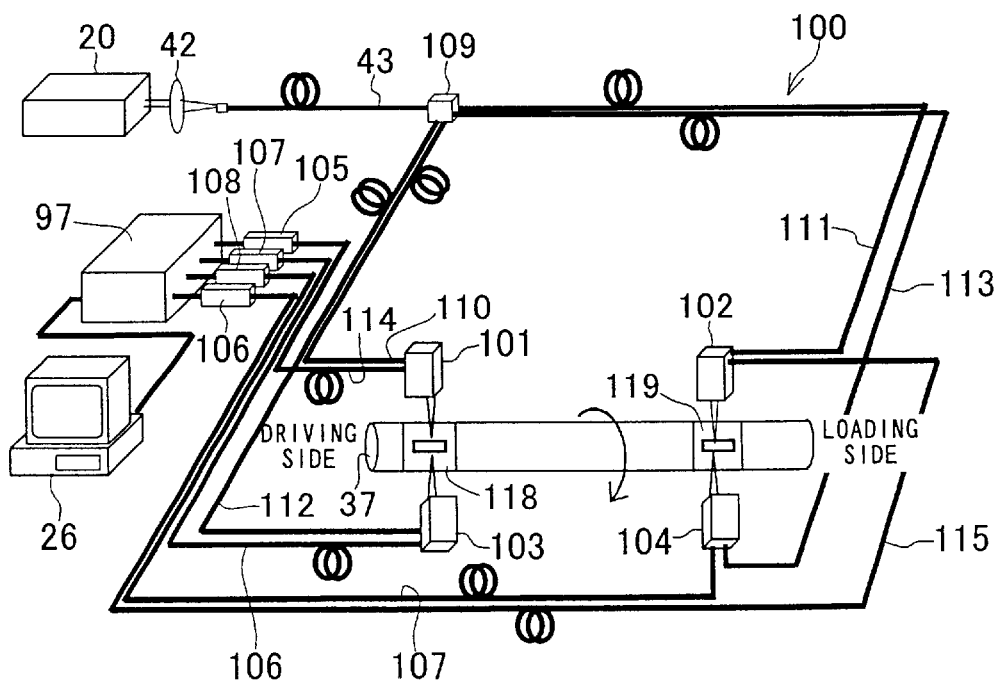
FIG. 24 is a diagram illustrating a seventh embodiment of a torque measuring device according to the present invention.
Figure 25:
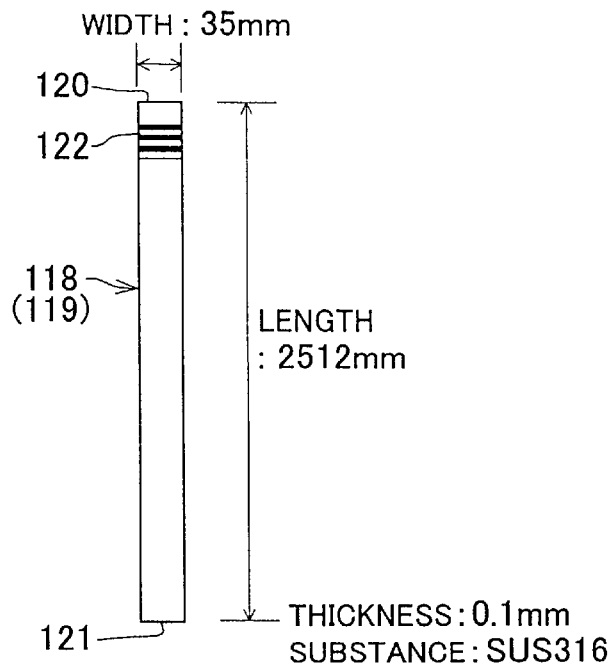
FIG. 25 is an explanatory view for showing a first reflector and a second reflector shown in FIG. 24.

As shown in FIG. 24, the torque measuring device according to the seventh embodiment of the present invention substantially comprises an irradiation device 20 for irradiating a light, an optical transmitter 100 for branching the light from the irradiation device 20 into lights as beams in the four directions, first to fourth beam controllers 101 to 104 for controlling the beam diameters of the first to the fourth branched lights, respectively, and irradiating them to a member or body 37 to be measured, first to fourth detectors 105 to 108 for detecting the intensity variation of the first to fourth beam controllers 101 to 104 and a signal processor 26 for calculating the torque of the member 37 based on signals outputted from the detectors 105 to 108.

The optical transmitter 100 comprises a lens 42 for entering the light irradiated from the irradiation device 20 into an optical fiber 43, a quartering branch device 109 for transmitting the light through the optical fiber 43 and equally branching the transmitted light into the first to fourth lights (beams), optical fibers 110 to 113 for transmitting the first to fourth branched lights to the first to fourth beam controllers 101 to 104 and optical fibers 114 to 117 for connecting the first to fourth beam controllers 101 to 104 with the first to fourth detectors 105 to 108.

The third beam controller 103 is installed at the driving side of the member 37 with the member 37 being interposed between the third beam controller 103 and the first beam controller 101 which is positioned so as to oppose to the third beam controller 103 at angle of 180°. Furthermore, the fourth beam controller 104 is installed at the loading side of the member 37 with the member 37 being interposed between the fourth beam controller 104 and the second beam controller 102 which is positioned so as to oppose to the fourth beam controller 104 at angle of 180°. The third and fourth beam controllers 103 and 104, as well as the first and second beam controllers 101 and 102, control the beam diameters of the third and fourth branched light beams and irradiate them to the first and second reflectors 118 and 119.

Figure 26:
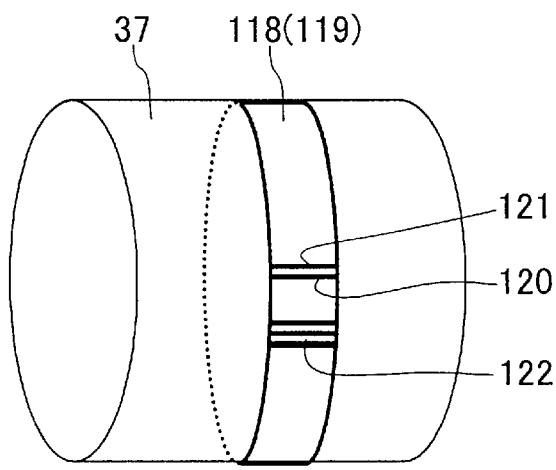
FIG. 26 is an explanatory view for showing a method of mounting the first reflector and the second reflector shown in FIG. 24.

As shown in FIG. 26, the first and the second reflectors 118 and 119 are composed of a thin plate of SUS 316 having a length of 2512 mm, a width of 35 mm and a thickness of 0.1 mm and have a bar code portion 122 as a reflecting pattern, which is arranged in parallel with an upper end surface 120 and a lower end surface 121 of the second reflectors 118 and 119. The bar code portion 122 has the same structure as that of the upper bar code 91. The first and second reflectors 118 and 119 have the length which is the same as the circumferential length of the member 37 to be measured and the width, which is longer than the amount of movement (moving amount) in the axial direction of the member 37 during the rotation thereof. Further, SUS 316 as a material of the first and the second reflectors 118 and 119 reflects a light strongly and has a corrosive resistance. In the present embodiment, the bar code portion 122 is arranged at only one point in the first and second reflectors 118 and 119. However, a plurality of bar codes 122 may be located thereto.

The first reflector 118 is wound around and mounted at the driving side of the member 37 by means of welding or by an adhesive as shown in FIG. 26. The first reflector 118 is wound around the member 37 by one turn and the upper end surface 120 of the first reflector 118 and the lower end surface 121 thereof are in contact with each other. In the same way, the second reflector 119 is wound around at the loading side of the member 37.

The third detector 107 is composed of an avalanche photodiode of a structure so as to output an electric signal having a positive-negative inversion. The third detector 107 is connected to the third optical fiber 116, which transmits the reflected light of the third light received by the third beam controller 103 and reflected by the first reflector 108. In the same way, the fourth detector 108 is also composed of the avalanche photodiode of a structure to output an electric signal having a positive-negative inversion The fourth detector 108 is connected to the fourth optical fiber 117, which transmits the reflected light of the fourth light received by the fourth beam controller 104 and reflected by the second reflector 119.

The first through fourth detectors 105 to 108 are connected to the AD converter 97. The AD converter 97 converts analog signals to be outputted from the first to fourth detectors 105 to 108, respectively, into digital data and transmits the digital data to the signal processor 26. The signal processor 26 processes the digital data received from the AD converter 97. The torque measuring device of the seventh embodiment, which is formed as described above, is explained below.

Figure 27:
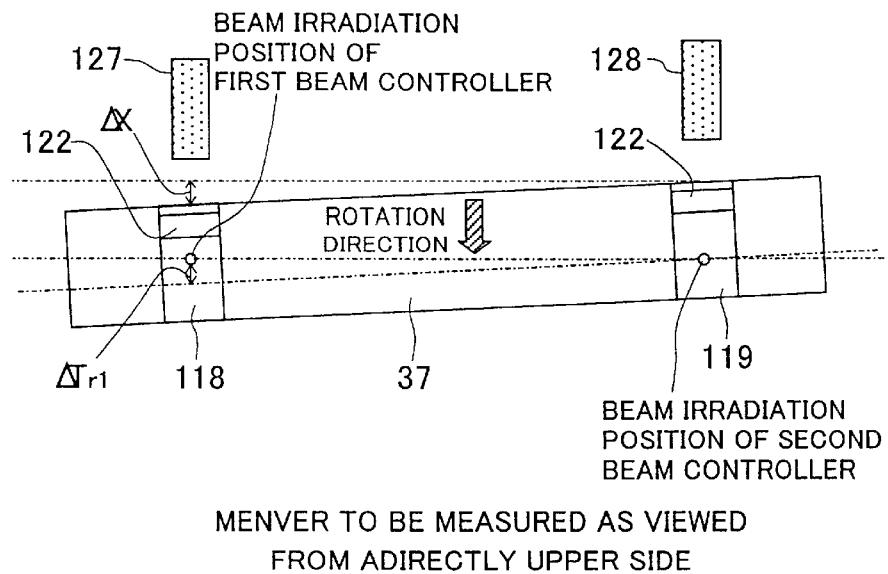
FIG. 27 is an explanatory view showing a positional change of a rotation axis other than an axial direction such that a directional change which occurs during the rotation of a rotation member or body to be measured and a moving amount thereof are different at a driving side and a loading side, respectively.

As well as the sixth embodiment, the member or body 37 to be measured comprises a transmission shaft which has a diameter of 800 mm, a rotation rate of 3000 rpm and a circumferential rate of 125 m/s. In addition to the movement in the axial direction during the rotation of the member 37, a positional change is caused as shown in FIG. 27 so that the amount of moving and the moving direction are different on the driving side and the loading side. The rotation rate and the diameter of the transmission shaft of the member 37 may take optional values.

On the other hand, since the first and the second reflectors 118 and 119 are wound around the body 37 to be measured by one turn, the area where they are in contact with the body 37 is large. Thus, since the first and the second reflectors 118 and 119 are equipped so as not to be detached from the body 37 during the rotation thereof, even under the conditions with high temperature, high humidity, coarse particles and strong wind or the like.

The laser beam irradiated from the irradiation device 20 is collected by the lens 42 and enters into the optical fiber 43. The beam is then branched into the first through fourth laser beams by the quartering branch device 109.

Figure 28:
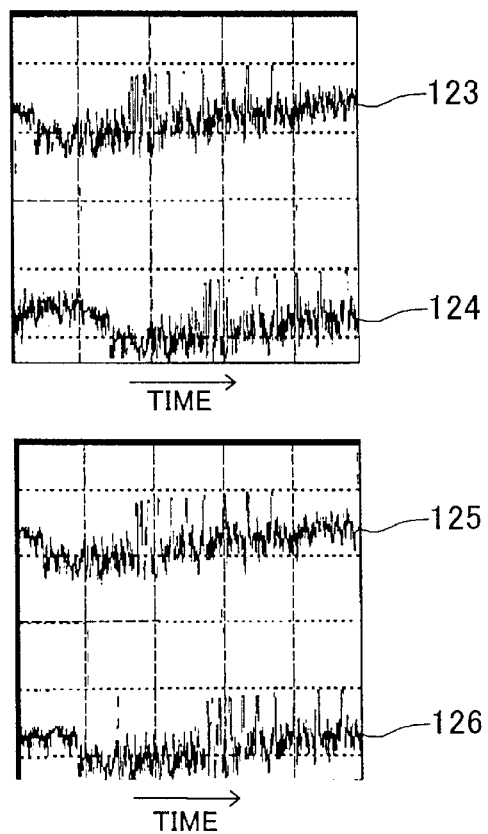
FIG. 28 is a graph showing measured waveforms, which is obtained from the seventh embodiment.
Figure 29:
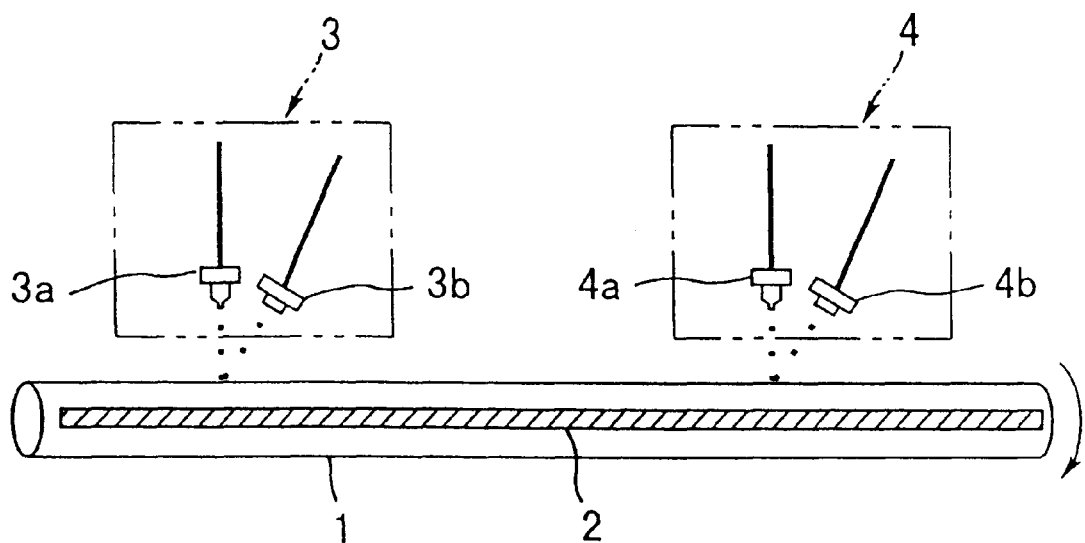
FIG. 29 is a diagram illustrating a torque detecting device as a first conventional example.
Figure 30:
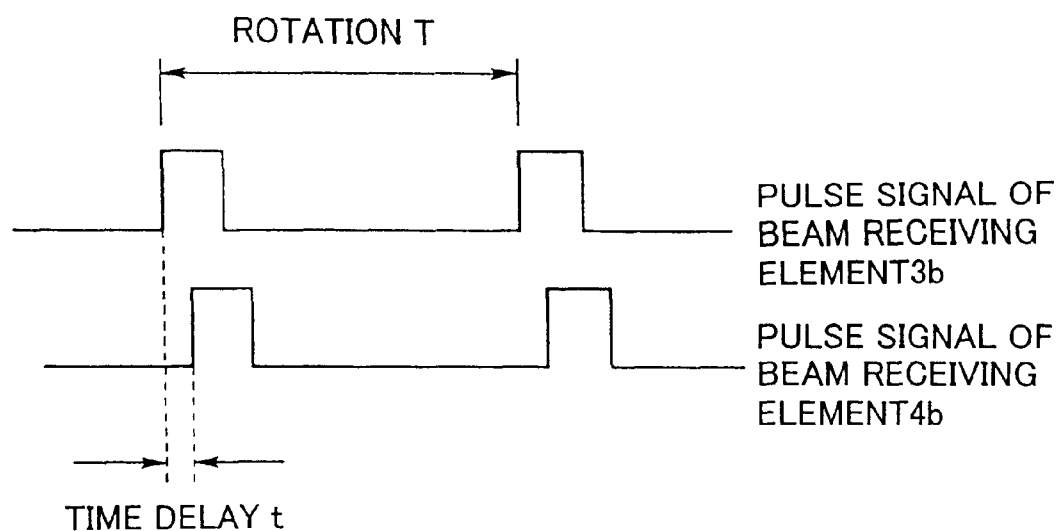
FIG. 30 is a timing chart showing a measured result, which is obtained from the first conventional example.
Figure 31:
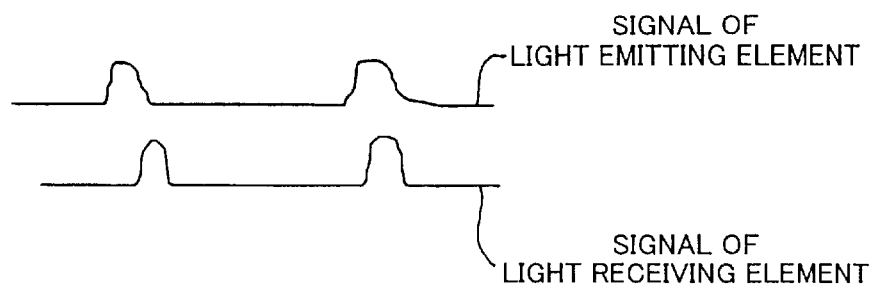
FIG. 31 is a timing chart showing another measured result, which is obtained from the first conventional example.
Figure 32:
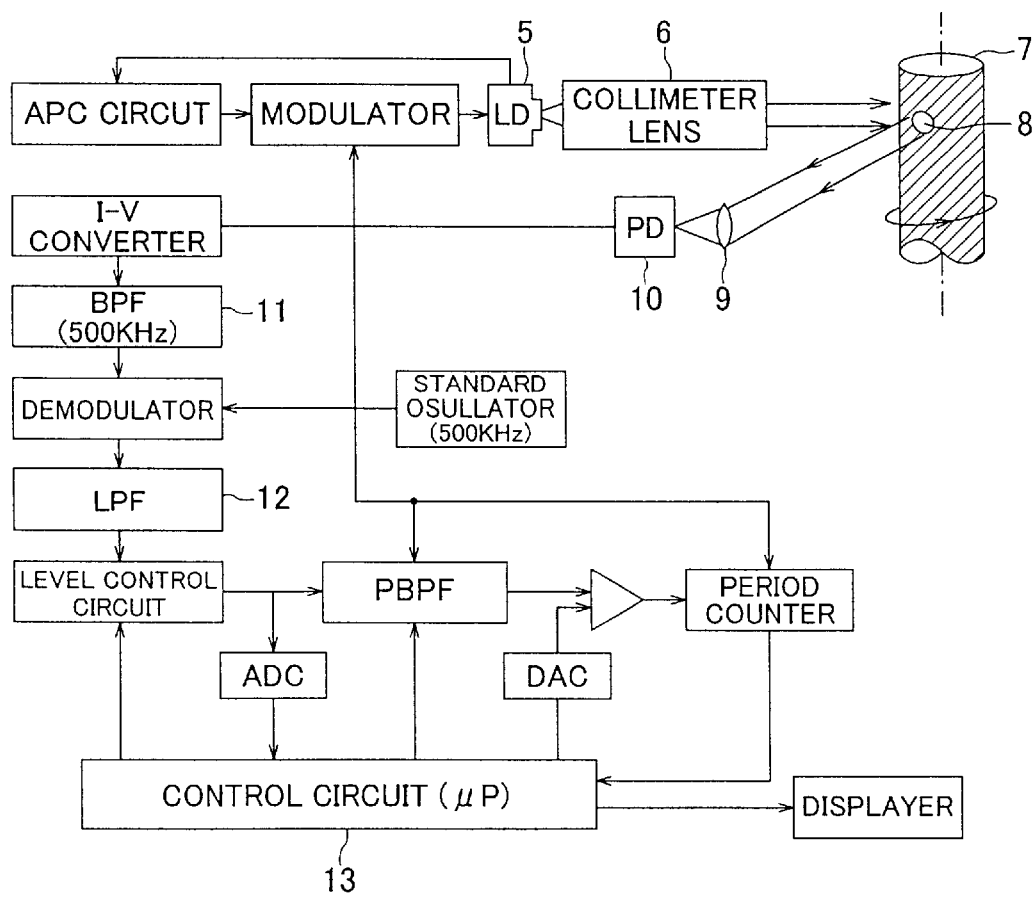
FIG. 32 is a block diagram illustrating a rotation rate measuring device of the second conventional example.
Figure 33:
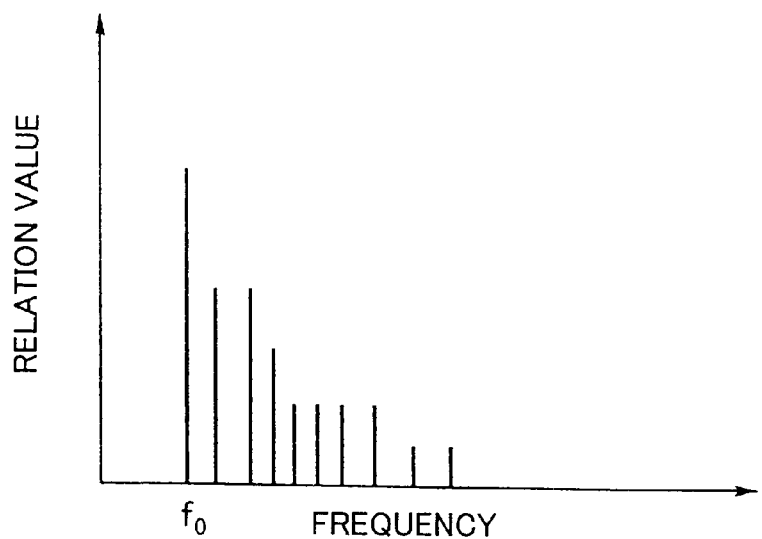
FIG. 33 is a graph showing a measured result, which is obtained from the second conventional example.
Figure 34:
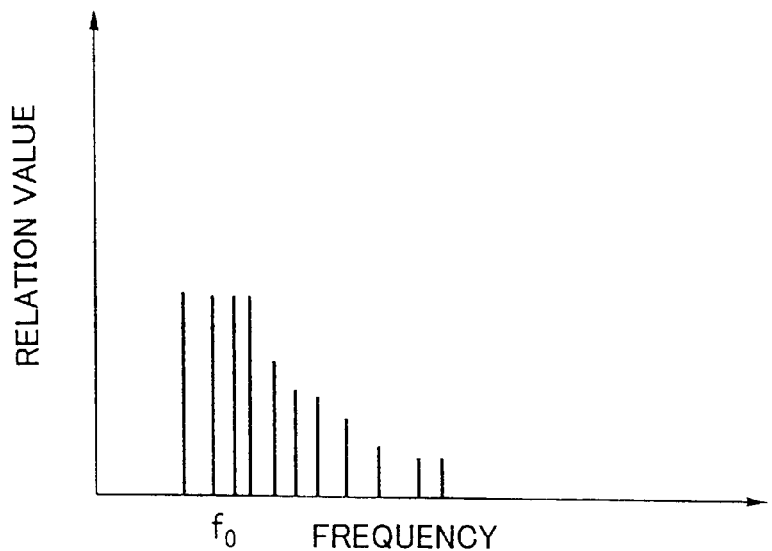
FIG. 34 is a graph showing another measured result, which is obtained from the second conventional example.

At first, the first laser beam is transmitted to the first beam controller 101 by the optical fiber 110. Then, the first beam controller 101 controls the first laser beam so that the first laser beam has a beam diameter of 5 μm on the surface of the first reflector 118 to be irradiated to the first reflector 118. The first laser beam irradiated to the first reflector 118 is not reflected when irradiated to the bar code line of the bar code portion 122. However, in other portions, for example, in a portion of the first reflector 118, the first laser beam is strongly reflected. The reflected first laser beam returns to the beam controller 101 and is transmitted through the first optical fiber 114, and then is detected by the first detector 105. Therefore, when the body 37 is rotating, the bar code of the bar code portion 122 and first detecting signals 123 with the same shapes are obtained for every rotation in the first detector 105 as shown in FIG. 28.

In the same way, the second to fourth laser beams are also affected by the same effect as that in the above mentioned first laser beam. Accordingly, the second to fourth detector 106 to 108 can obtain the second to fourth detecting signals 124 to 126 for every rotation as shown in FIG. 28. Then, the first through fourth detecting signals 123 to 126 are converted to the digital data by the AD converter 97 to be transmitted to the signal processor 26.

This signal processor 26 carries out the correlative calculation shown in the mathematical equation (12) by using the first detecting signal 123 to obtain a delay time, where the cross-correlation function of Φ(τ) takes the highest value and a rotational period $T_t$ of the member 37. In the same way, the rotational period $T_t$ of the member 37 may be obtained by using the second to fourth detecting signals 124 to 126.

This signal processor 26 carries out the correlative calculation by the mathematical equation (13) by using the first and second detecting signals 123 and 124 to obtain a delay time, in which the cross-correlation function of $\Phi_t(\tau)$ takes the highest value and a measured time difference $T'_{r1}$. The measured time difference $T'_{r1}$ includes a measured time error $\Delta T_{r1}$ shown in FIG. 27 generated by the positional change of the member 37 such that the moving amount a nd the moving direction are different at the driving side and the loading side, in addition to the measured time difference $T_r$ of the first and second detecting signals 123 and 124, which is generated by the torque. Accordingly, the measured time difference $T'_{r1}$ can be expressed by the mathematical equation (15).

$$T'_{r1} = T_r + 2 \cdot \Delta T_{r1} \quad (15)$$

In the same way, the correlative calculation shown in the mathematical equation (13) is carried out by using the third and fourth detecting signals 125 and 126 to obtain a delay time, in which the cross-correlation function of $\Phi_t(\tau)$ takes the highest value and a measured time difference $T'_{r2}$. The measured time difference $T'_{r2}$ includes a measured time error $\Delta T_{r2}$ shown in FIG. 27 generated by a positional change of the member 37 such that the moving amount and the moving direction are different at the driving side and the loading side, in addition to the measured time difference $T_r$ of the third and fourth detecting signals 125 and 126, which is generated by the torque. The third beam controller 103 and the fourth beam controller 104 are arranged with being opposed by the angle of 180 degrees to the first beam controller 101 and the second beam controller 102, respectively, so that the measured time error $\Delta T_{r2}$ has the same value as the value of the time error $\Delta T_{r1}$ and the positive-negative state is inverted. Therefore, the measured time difference $T'_{r2}$ is expressed by the mathematical equation (16).

(Mathematical Equation 16)

$$\begin{aligned} T'_{r2} &= T_r + 2 \cdot \Delta T_{r2} \\ &= T_r - 2 \cdot \Delta T_{r1} \end{aligned} \quad (16)$$

Then, as shown in a following mathematical equation (17), the measured time difference $T'_{r1}$ and the measured time difference $T'_{r2}$ are averaged.

(Mathematical Equation 17)

$$\begin{aligned} (T'_{r1} + T'_{r2})/2 &= \{(T_r + 2 \cdot \Delta T_{r1}) + (T_r + 2 \cdot \Delta T_{r2})\}/2 \\ &= \{(T_r + 2 \cdot \Delta T_{r1}) + (T_r - 2 \cdot \Delta T_{r1})\}/2 \\ &= T_r \end{aligned} \quad (17)$$

As a result of such averaging, the measured time errors $\Delta T_{r1}$ and $\Delta T_{r2}$ generated by the positional change of the measured body 37 so that the moving amount and the moving direction are different on the driving side and the loading side, can be cancelled. Therefore, the measured time difference $T_r$ generated by the torque can be obtained.

The mathematical equation (14) is calculated by using the measured time differences $T_r$ and the rotational period $T_t$.

Thus, it is possible to correct the measuring time error caused by the positional change of the measured body 37 so that the moving amount and the moving direction are different on the driving side and the loading side, thus obtaining the torque $F_t$ with a high accuracy.

The measuring time errors $\Delta T_{r1}$ and $\Delta T_{r2}$ are caused by the positional change of the body 37 such that the moving amount and the moving direction are different on the driving side and the loading side. The values of the measuring time errors $\Delta T_{r1}$ and $\Delta T_{r2}$ can be obtained by using the first and the second distance sensors (detectors) shown in FIG. 27. The first distance sensor 127 is arranged with being opposed by the angle of 90 degrees to the first and third beam controllers 101 and 103. In the same way, the second distance sensor 128 is opposed by the angle of 90 degrees to the second and fourth beam controllers 102 and 104 and is arranged at the same side of the first distance sensor 127.

Further, by obtaining the positional change amount $\Delta X$ of the measured body 37 and using the mathematical equation (18), there are obtained the values of the measuring time errors $\Delta T_{r1}$ and $\Delta T_{r2}$ due to the positional change of the member 37 so that the moving amount and the moving direction are different at the driving side and the loading side.

(Mathematical Equation 18)

$$\Delta T_{r1} = -\Delta T_{r2} = \Delta X/(\pi D \cdot 1/T_t) \quad (18)$$

D=diameter of transmission shaft of body 37 (=800 [mm])

By using the value obtained in the mathematical equation (18) and calculating the mathematical equations (15) and (16), the measured time differences $T_r$ caused by the torque can be obtained without using the mathematical equation (17). In this case, it is not necessary to carry out an averaging processing represented by the mathematical equation (17), i.e., it is not necessary to locate the third and fourth beam controllers 103 and 104.

Thus, when the values of the measuring time errors $\Delta T_{r1}$ and $\Delta T_{r2}$, which are occurred by the positional change of the member 37 so that the moving amount and the moving direction are different at the driving side and the loading side, are obtained by using the first and second distance sensors 127 and 128, it is not necessary to arrange the third and fourth beam controllers 103 and 104.

Since the first reflector 118 is equipped to the member 37 with being wound around the member 37 by one turn and with the upper end surface 120 and the lower end surface 121 of the first reflector 118 being in contact with each other, the first reflector 118 is equipped to the member 37 in parallel with the rotational axis thereof. In the same manner, since the second reflector 119 is equipped to the member 37 in parallel with the rotational axis thereof, the measured time difference $T_r$ does not have an error, but have a constant value, even when there is a movement in the axial direction during the rotation of the member 37.

In this way, according to the present embodiment, the signal processor 26 carries out the correlative calculation shown in the mathematical equation (13) by using the first and the second detecting signals 123 and 124 and obtaining a delay time, where the cross-correlation function of $\Phi_i(\tau)$ takes the highest value, the signal processor 26 obtains the measured time difference $T'_{r1}$ shown in the mathematical equation (15). Further, the signal processor 26 carries out the correlative calculation through the mathematical equation (13) by using the third and fourth detecting signals 125 and 126 and obtaining a delay time, in which the cross-correlation function of $\Phi_i(\tau)$ takes the highest value, the signal processor 26 obtains the measured time difference $T'_{r2}$ shown in the mathematical equation (16).

Since the third and fourth beam controllers 103 and 104 are opposed to the first and second beam controllers 101 and 102 by the angle of 180 degrees, respectively, it is possible to cancel the measuring time errors $\Delta T_{r1}$ and $\Delta T_{r2}$, which are caused by the positional change of the member 37 shown in FIG. 27 so that the moving amount and the moving direction are different at the driving side and the loading side, and the measuring time errors are corrected by the averaging process represented by the mathematical equation (17). Therefore, even in the positional change of the member 37 shown in FIG. 27 so that the moving amount and the moving direction are different at the driving side and the loading side, it is possible to obtain the torque $F_t$ of the measured body 37 by the mathematical equation (14) with a high accuracy.

Further, since the first and second reflectors 118 and 119 are equipped to the measured body 37 with being wound around the member 37 by one turn and with the upper end surface 33 and the lower end surface 34 being in contact with each other, the first and second reflectors 118 and 119 are equipped to the member 37 in parallel with the rotational axis of the member 37. Therefore, the measured time difference $T_r$ for obtaining the torque of the member 37 does not provide an error, even in the movement in the axial direction during the rotation of the measured member 37. Accordingly, even in the movement in the axial direction during the rotation of the member 37, the torque $F_t$ thereof can be obtained by the mathematical equation (11) and (14) with a high accuracy.

Further, the first and the second reflectors 118 and 119 are able to keep large the area in contact with the member 37, so that it is possible to prevent the first and second reflectors 118 and 119 from being detached from the member 37 by a use condition and an ambient condition thereof.

The present invention is not limited to the above described embodiments, but various modifications are available. For example, according to the first through fourth and the sixth embodiments, although the structures in which two reflectors and two detectors are equipped are explained, more than two reflectors and more than two detectors may be equipped.

What is claimed is:

1. A torque measuring device comprising:
   an irradiation means for irradiating a light;
   a control means, operatively connected to the irradiation means adapted to branch the light into a plurality of lights as beams, control a beam diameter of each of the respective lights and a focusing depth thereof and irradiate the light regularly on a surface of a rotating member to be measured;
   a reflecting means, including a plurality of reflectors disposed on the surface of the rotating member, for reflecting the light along substantially a same path as that of irradiation so as to change reflection intensity of the light;
   a detecting means including a plurality of detectors for detecting the change of the intensity of each of the reflected lights and generating signals thereof; and
   a signal processing means for processing the signals from the detecting means and operating a rotation period on the basis of the signals from said detecting means to thereby calculate a torque of the rotating member to be measured.

2. A torque measuring device according to claim 1, further comprising an optical fiber through which the light from the irradiation means is transmitted to the control means.

3. A torque measuring device according to claim 1, wherein said reflecting means comprises a low reflector having a reflection coefficient of the reflected light lower than that of the surface of said member to be measured.

4. A torque measuring device according to claim 1, wherein said reflecting means comprises a reflector including a high reflection area having a reflection coefficient of the reflected light higher than that of the surface of said member to be measured and a low reflection area having a reflection coefficient of the reflected light lower than that of the high reflection area.

5. A torque measuring device according to claim 1, wherein said reflecting means comprises a reflector including a reflection area reflecting the irradiated light from the irradiation means in a direction of a location of the detecting means and a diffusing reflection area reflecting diffusingly at least one portion of the irradiated light from the irradiation means in a direction other than said direction of the detecting means.

6. A torque measuring device according to claim 1, wherein said signal processing means is provided with a variable threshold setting means for varying a threshold according to a variation of an output of the detecting means to thereby extract a detection signal.

7. A torque measuring device according to claim 1, further comprising a filtering means for removing a signal component other than the detection signal from the signals outputted from the detecting means.

8. A torque measuring device according to claim 1, further comprising a relative processing means for carrying out a relative processing of the output from the detecting means to obtain the torque of the member to be measured.

9. A torque measuring device according to claim 1, wherein said detecting means comprise a first detector and a second detector and said first detector is mounted with a measuring means for monitoring the second detector to thereby measure a position change of the second detector.

10. A torque measuring device according to claim 1, wherein said detecting means includes a first and a second detectors and said first detector is provided with an irradiation member for transmitting a light to the second detector and said second detector is provided with a positional change measuring means which detects the irradiated light and measures the positional change of the first and second detectors.

11. A torque measuring device according to claim 1, wherein the torque measuring device has a device body which is arranged along a circumferential direction of the member to be measured.

12. A torque measuring device according to claim 1, wherein the torque measuring device has a device body which is arranged along an axial direction of the member to be measured.

13. A torque measuring device according to claim 1, wherein said reflecting means are the plural reflectors which are formed by directly forming reflection patterns on the member to be measured.

14. A torque measuring device according to claim 1, wherein each of said reflectors is formed of a reflector member having high reflection amount which has a length substantially the same as a circumferential length of the member to be measured and which is wound therearound, said reflector member being formed, at a portion thereof, with a low reflection area having less reflection light.

15. A torque measuring device according to claim 14, wherein a reflection pattern is a bar code pattern in which the low reflection area having less reflection light is formed in shape of plural lines to the reflector member having high reflection amount.

16. A torque measuring device according to claim 14, wherein said low reflection area has a shape variable along an axial direction of the member to be measured.

17. A torque measuring device according to claim 1, wherein said control means comprises a plurality of beam controllers which are arranged in a plurality of pairs so that beam controllers of each pair oppose to each other at an angle of 180° with the member to be measured being interposed therebetween.

18. A torque measuring device, comprising:

an irradiation device adapted to irradiate light;

a beam controller adapted to branch the light into a plurality of light beams, control a diameter of the light beams, and direct the light beams along an individual optical path to a rotating member;

a plurality of reflectors disposed on a surface of the rotating member, the reflectors being arranged to reflect a light beam received from the beam controller via the same individual optical path;

a plurality of detectors adapted to detect intensity variations of reflected light beams and generate signals based on the detected intensity variations; and a signal processor adapted to receive the generated signals and calculate a torque of the rotating member based on the received signals.

* * * * *